(12) United States Patent
Yang et al.

(10) Patent No.: US 10,129,881 B2
(45) Date of Patent: Nov. 13, 2018

(54) DATA TRANSMISSION METHOD AND DEVICE

(71) Applicant: Huawei Technologies Co., Ltd., Shenzhen (CN)

(72) Inventors: Xun Yang, Shenzhen (CN); Tianyu Wu, Shenzhen (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 128 days.

(21) Appl. No.: 15/082,906

(22) Filed: Mar. 28, 2016

(65) Prior Publication Data
US 2016/0212748 A1 Jul. 21, 2016

Related U.S. Application Data

(63) Continuation of application No. PCT/CN2013/084556, filed on Sep. 29, 2013.

(51) Int. Cl.
*H04W 72/04* (2009.01)
*H04L 5/00* (2006.01)
(Continued)

(52) U.S. Cl.
CPC ....... *H04W 72/0453* (2013.01); *H04L 1/1854* (2013.01); *H04L 1/1874* (2013.01);
(Continued)

(58) Field of Classification Search
CPC ................................................. H04W 72/0453
See application file for complete search history.

(56) References Cited

U.S. PATENT DOCUMENTS 6,505,253 B1 1/2003 Chiu et al.
7,872,997 B2 * 1/2011 Qian ..................... H04L 1/1628
370/312
(Continued)

FOREIGN PATENT DOCUMENTS

CN 101094047 A 12/2007
CN 101278529 A 10/2008
(Continued)

OTHER PUBLICATIONS

Zhang et al., "Frame Retransmissions Considered Harmful: Improving Spectrum Efficiency Using Micro-ACKs," MobiCom, Istanbul Turkey, ACM, New York, New York (Aug. 22-26, 2012).

*Primary Examiner* — Andrew Lai
*Assistant Examiner* — Andrew C Lee
(74) *Attorney, Agent, or Firm* — Leydig, Voit & Mayer, Ltd.

(57) ABSTRACT

Disclosed is a data transmission method. The method comprises: reserving a first channel and a second channel, where the first channel is used for transmitting data and the second channel is used for transmitting ACKs; sending data to a receiving end on the first channel that is reserved; receiving an ACK that is sent by the receiving end and corresponds to the data on the second channel that is reserved and determining whether the data needs to be cached based on information carried in the ACK; and if the information carried in the ACK indicates that the receiving end has correctly received the data, clearing the data that is cached by a sending end. Through separate transmission of the data and the ACK, an efficiency problem of the sending end in providing MAC in a wireless system in a condition of a limited cache capacity is resolved.

11 Claims, 11 Drawing Sheets

(51) Int. Cl.
*H04L 1/18* (2006.01)
*H04W 74/08* (2009.01)

(52) U.S. Cl.
CPC .......... *H04L 1/1896* (2013.01); *H04L 5/0055* (2013.01); *H04W 74/0816* (2013.01)

(56) References Cited

U.S. PATENT DOCUMENTS

| | | | | |
|---|---|---|---|---|
| 8,259,745 B2* | 9/2012 | Gong | ................ | H04W 74/0816 370/329 |
| 8,428,041 B2* | 4/2013 | Sakoda | ................ | H04L 1/0002 370/347 |
| 8,842,657 B2* | 9/2014 | Walton | ................ | H04L 12/66 370/348 |
| 8,861,495 B2* | 10/2014 | Kim | ................ | H04W 74/0816 370/329 |
| 9,479,738 B2* | 10/2016 | Hwang | ............. | H04N 7/17318 |
| 2004/0047292 A1* | 3/2004 | du Crest | ................ | H04L 47/14 370/235 |
| 2005/0135318 A1* | 6/2005 | Walton | ................ | H04L 12/66 370/338 |
| 2006/0187964 A1* | 8/2006 | Li | ................ | H04W 74/002 370/474 |
| 2006/0203731 A1* | 9/2006 | Tiedemann, Jr. | ....... | H04L 47/10 370/235 |
| 2007/0002821 A1* | 1/2007 | Carlson | ................ | H04L 29/06 370/349 |
| 2008/0076466 A1* | 3/2008 | Larsson | ................ | H04W 28/18 455/522 |
| 2008/0144493 A1* | 6/2008 | Yeh | ................ | H04W 52/50 370/230 |
| 2008/0192723 A1* | 8/2008 | Kwon | ................ | H04W 28/20 370/345 |
| 2009/0268747 A1 | 10/2009 | Kurata et al. | | |
| 2010/0165907 A1* | 7/2010 | Chu | ................ | H04L 12/1868 370/312 |
| 2010/0329220 A1* | 12/2010 | Kim | ................ | H04W 72/1289 370/336 |
| 2011/0222490 A1* | 9/2011 | Fischer | ................ | H04L 5/0007 370/329 |
| 2011/0249659 A1 | 10/2011 | Fontaine et al. | | |
| 2012/0008500 A1* | 1/2012 | Wang | ................ | G06F 13/385 370/235 |
| 2012/0008599 A1* | 1/2012 | Marin | ................ | H04W 74/006 370/336 |
| 2012/0076073 A1* | 3/2012 | Merlin | ............. | H04W 74/0816 370/328 |
| 2012/0087316 A1* | 4/2012 | Merlin | ................ | H04W 28/26 370/329 |
| 2012/0113952 A1* | 5/2012 | Kneckt | ................ | H04W 72/0406 370/330 |
| 2012/0182963 A1* | 7/2012 | Kneckt | ............. | H04W 72/0453 370/330 |
| 2013/0229996 A1* | 9/2013 | Wang | ................ | H04W 72/0413 370/329 |
| 2013/0272288 A1* | 10/2013 | Li | ................ | H04L 5/0053 370/338 |
| 2013/0322371 A1* | 12/2013 | Prakash | ................ | H04W 72/04 370/329 |
| 2014/0079016 A1* | 3/2014 | Dai | ................ | H04L 5/0041 370/330 |

FOREIGN PATENT DOCUMENTS

| | | |
|---|---|---|
| CN | 102006630 A | 4/2011 |
| EP | 2693816 A1 | 2/2014 |
| WO | WO 2012130094 A1 | 10/2012 |

* cited by examiner

DATA TRANSMISSION METHOD AND DEVICE

CROSS-REFERENCE TO RELATED APPLICATIONS

This application is a continuation of International Patent Application No. PCT/CN2013/084556, filed on Sep. 29, 2013, which is hereby incorporated by reference in its entirety.

TECHNICAL FIELD

The present disclosure relates to the technical field of communications, and in particular to a method and a device for transmitting data.

BACKGROUND

The reliability of a wireless channel is a key factor influencing the performance of a wireless communication system. There are multiple methods for improving the reliability of wireless communications, which include a channel coding method with an excellent performance, a combination method of channel coding and modulation, a method utilizing both space-time coding for a diversity gain and multiple-antenna receiver diversity, and a hybrid repeated transmission method utilizing a time variation feature of a channel, and so on. In the hybrid repeated transmission method utilizing the time variation feature of the channel, signals in an error part are repeatedly transmitted in the time variation channel in different coding and mapping manners, signals to be repeatedly transmitted and signals which have been repeatedly transmitted are merged by a receiver, that is, the multiple independent signals are merged, to confront fading of the wireless channel by using a diversity, thereby improving the transmission reliability of the wireless channel.

For different wireless communication systems, different hybrid repeated transmission methods utilizing a time variation feature of a channel are used. For example, a method in which recombination is performed for each repeated transmission is used in a cellular network, so that a diversity gain in a time dimension can be obtained; whereas a simple repeated transmission is used in a wireless local area network (WLAN) system, that is, multiple repeated transmissions are performed in a same manner. The wireless channel is quasi-static, therefore, the transmission reliability can be improved with only the simple repeated transmission, and in addition, the simplicity of the wireless communication system can be ensured.

With the increasing user requirements, throughput of the wireless communication system needs to be increased. Since overhead of the transmission takes a fixed time and increasing the throughput cannot reduce the time taken by the overhead, for fixed-length data packets, increased throughput may lead to decreased efficiency of a media access control (MAC) layer in the time dimension. In order to increase the throughput and keep the efficiency of the MAC unchanged, lengths of data packets in the MAC layer need to be increased by the same proportion.

Usually, the repeated transmission used by the WLAN system includes: in a case of a single user, a transmitter sends data, waits for and receives an ACK or a block ACK (BA) fed back by the receiver, and clears data in a cache after the ACK for the data is received or sends again the data which is not correctly received by the receiver; in a case of multiple users, data and a block ACK request (BAR) are sent for each of the multiple users by the transmitter, the receiver is requested to sent the BA, and if the length of data packets exceeds the length of the cache, the cache overflows and an unrecoverable loss of data is caused. In the case of the multiple users, the BAR and the BA are sent for each of the multiple users, which results in high overhead and low efficiency of the MAC.

SUMMARY

The present disclosure is to provide a method for transmitting data, so as to solve a problem that how to improve efficiency of a MAC in a wireless system in a case of a limited cache capacity.

In a first aspect, a method for transmitting data is provided, which includes:

reserving, by a transmitter, a first channel and a second channel, where the first channel is used to transmit the data and the second channel is used to transmit an acknowledgement ACK;

sending, on the reserved first channel, the data, to a receiver; and receiving, on the reserved second channel, the ACK corresponding to the data, sent by the receiver.

In conjunction with the first aspect, in a first possible implementation of the first aspect, reserving, by a transmitter, a first channel and a second channel includes:

sending, by the transmitter, on the first channel, a first channel reservation frame, to the receiver, and sending, by the transmitter, on the second channel, a second channel reservation frame, to the receiver, where the first channel reservation frame is used to reserve the first channel and carry time for reserving the first channel, and the second channel reservation frame is used to reserve the second channel and carry time for reserving the second channel; and determining, by the transmitter, whether the first channel is successfully reserved, based on at least one of a response frame of the first channel reservation frame and a response frame of the second channel reservation frame, sent by the receiver, and determining, by the transmitter, whether the second channel is successfully reserved, based on at least one of the response frame of the first channel reservation frame and the response frame of the second channel reservation frame, sent by the receiver.

In conjunction with the first possible implementation of the first aspect, in a second possible implementation of the first aspect, the method further includes:

carrying, by the transmitter, a maximum cache capacity, in at least one of the first channel reservation frame and the second channel reservation frame, in a preamble or in a capability field, where the maximum cache capacity is used by the receiver to determine latest time for sending the ACK corresponding to the data to the transmitter.

In conjunction with the second possible implementation of the first aspect, in a third possible implementation of the first aspect, sending, on the reserved first channel, the data, to a receiver includes:

sending, by the transmitter, on the reserved first channel, the data, to the receiver; and receiving, on the reserved second channel, the ACK corresponding to the data, sent by the receiver includes:

calculating, by the receiver, time for reaching the maximum cache capacity of the transmitter, based on a rate carried by the preamble at which the transmitter sends the data, or, receiving, by the receiver, the time for reaching the maximum cache capacity of the transmitter, sent by the transmitter;

sending, by the receiver, the ACK, to the transmitter, after idle PIFS time of the second channel, after SIFS time of the preamble or after a response request frame corresponding to the data is sent by the transmitter, and before the time for reaching the maximum cache capacity of the transmitter; or, sending, by the receiver, the ACK, to the transmitter, in a limited contention-free manner or by means of CSMA; and receiving, by the transmitter, on the second channel, the ACK corresponding to the data.

In conjunction with the second possible implementation of the first aspect, in a fourth possible implementation of the first aspect, there are multiple receivers, sending, on the reserved first channel, the data, to a receiver includes:

sending, by the transmitter, on the reserved first channel, the data, to the multiple receivers, by means of downlink multi-user transmission; and the process of receiving, on the reserved second channel, the ACK corresponding to the data, sent by the receiver includes:

receiving, by the multiple receivers, on the first channel, the data;

in a case that all the multiple receivers support uplink multi-user transmission, sending, by the transmitter, on the reserved second channel, response request frames corresponding to the data, and after the response request frames are received by the multiple receivers, sending by the multiple receivers acknowledgements ACKs to the transmitter at the same time by means of uplink multi-user transmission before a minimum one of times for reaching maximum cache capacities of the transmitter for the multiple receivers; or, in a case the multiple receivers do not support the uplink multi-user transmission, after the response request frames are received by the multiple receivers, calculating, by the multiple receivers, the times for reaching the maximum cache capacities of the transmitter, corresponding to the multiple receivers, based on rates carried by the preamble at which the transmitter sends respectively the data to the multiple receivers, and before the times for reaching the maximum cache capacities of the transmitter corresponding to the multiple receivers, sending respectively by the multiple receivers the acknowledgements ACKs to the transmitter; or, sending respectively by the multiple receivers on the second channel the ACKs to the transmitter in a limited contention-free manner; and receiving, by the transmitter, on the second channel, the ACKs corresponding to the data, sent by the multiple receivers.

In conjunction with the second possible implementation of the first aspect, in a fifth possible implementation of the first aspect, there are multiple transmitters, sending, on the reserved first channel, the data, to a receiver includes:

sending, by the multiple transmitters, on the first channel, the data, to the receiver, by means of uplink multi-user transmission; and receiving, on the reserved second channel, the ACK corresponding to the data, sent by the receiver includes:

calculating, respectively, by the receiver, latest times for reaching maximum cache capacities of the multiple transmitters, corresponding to the multiple transmitters, based on rates carried by preambles at which the multiple transmitters send the data to the receiver, and before a minimum one of the times for reaching the maximum cache capacities of the multiple transmitters, sending by the receiver acknowledgements ACKs to the multiple transmitters at the same time by means of downlink multi-user transmission; or, sending respectively by the multiple transmitters latest times corresponding to the multiple transmitters to the receiver, receiving by the receiver the latest times, and before the minimum one of the times for reaching the maximum cache capacities of the multiple transmitters, sending by the receiver the acknowledgements ACKs to the multiple transmitters at the same time by means of downlink multi-user transmission; or, calculating, respectively, by the receiver, the times for reaching the maximum cache capacities of the multiple transmitters, corresponding to the multiple transmitters, based on the rates carried by the preambles at which the multiple transmitters send the data to the receiver, and before the times for reaching the maximum cache capacities of the multiple transmitters, sending respectively by the receiver the acknowledges ACKs to the multiple transmitters;

sending by the receiver on the second channel the ACKs to the multiple transmitters in a limited contention-free manner or by means of CSMA; and receiving, by the multiple transmitters, on the second channel, the ACKs corresponding to the data, sent by the receiver.

In conjunction with the second possible implementation of the first aspect, in a sixth possible implementation of the first aspect, there are multiple transmitters, there are multiple receivers, sending, on the reserved first channel, the data, to a receiver includes:

sending, by the multiple transmitters, on the first channel, the data, to the multiple receivers, by means of cooperative transmission; and receiving, on the reserved second channel, the ACK corresponding to the data, sent by the receiver includes:

sending, respectively, by the multiple transmitters, on the reserved second channel, response request frames corresponding to the data, by means of Poll, and after the response request frames are received by the plurality of receivers and after SIFS, sending by the multiple receivers ACKs to the multiple transmitters; or, requesting the multiple receivers to send the ACKs by the multiple transmitters respectively on the second channel in a limited contention-free manner; or, sending respectively by the multiple receivers the ACKs to the multiple transmitters in a limited contention-free manner; and receiving, by the multiple transmitters, on the second channel, the ACKs corresponding to the data, sent by the multiple receivers.

In conjunction with the first aspect, the first possible implementation of the first aspect, the second possible implementation of the first aspect, the third possible implementation of the first aspect, the fourth possible implementation of the first aspect, the fifth possible implementation of the first aspect or the sixth possible implementation of the first aspect, in a seventh possible implementation of the first aspect, the method further includes:

carrying, by the transmitter, starting time for channel reservation, in at least one of the first channel reservation frame and the second channel reservation frame, in the data or in the preamble.

In conjunction with the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect or the seventh possible implementation of the first aspect, in an eighth possible implementation of the first aspect, the method further includes:

sending, by the transmitter, an instruction for returning to a preset operating mode, to the receiver, in a case that at least one of the first channel and the second channel is not successfully reserved by the transmitter.

In a second aspect, a method for transmitting data is provided, which includes:

sending, by a transmitter, the data and a maximum cache capacity, to a receiver, where the maximum cache capacity is used by the receiver to determine latest time for sending an acknowledgement ACK corresponding to the data to the transmitter; and receiving, by the transmitter, the ACK, sent by the receiver based on the maximum cache capacity.

In a third aspect, a method for transmitting data is provided, which includes:

reserving, by a receiver, a first channel and a second channel, where the first channel is used to transmit the data and the second channel is used to transmit an acknowledgement ACK;

receiving, the data, sent by a transmitter on the first channel; and sending, on the reserved second channel, the ACK corresponding to the data, to the transmitter.

In conjunction with the third aspect, in a first possible implementation of the third aspect, reserving, by a receiver, a first channel and a second channel includes:

receiving, by the receiver, on the first channel, a first channel reservation frame, sent by the transmitter, and receiving, by the receiver, on the second channel, a second channel reservation frame, sent by the transmitter, where the first channel reservation frame is used to reserve the first channel and carry time for reserving the first channel, and the second channel reservation frame is used to reserve the second channel and carry time for reserving the second channel; and sending, by the receiver, at least one of a response frame of the first channel reservation frame and a response frame of the second channel reservation frame, to the transmitter, so as to enable the transmitter to determine whether the first channel is successfully reserved based on the at least one of the response frame of the first channel reservation frame and the response frame of the second channel reservation frame sent by the receiver, and to enable the transmitter to determine whether the second channel is successfully reserved based on the at least one of the response frame of the first channel reservation frame and the response frame of the second channel reservation frame sent by the receiver.

In conjunction with the first possible implementation of the third aspect, in a second possible implementation of the third aspect, the method further includes:

carrying, by the transmitter, a maximum cache capacity, in at least one of the first channel reservation frame and the second channel reservation frame, in a preamble or in a capability field, where the maximum cache capacity is used by the receiver to determine a latest time for sending the ACK corresponding to the data to the transmitter.

In conjunction with the second possible implementation of the third aspect, in a third possible implementation of the third aspect, receiving, the data, sent by a transmitter on the first channel includes:

receiving, the data, sent by the single transmitter on the first channel; and sending, on the reserved second channel, the ACK corresponding to the data, to the transmitter includes:

calculating, by the receiver, time for reaching the maximum cache capacity of the transmitter, based on a rate carried by the preamble at which the transmitter sends the data, or, receiving, by the receiver, the time for reaching the maximum cache capacity of the transmitter, sent by the transmitter;

sending, by the receiver, the ACK, to the transmitter, after idle PIFS time of the second channel, after SIFS time of the preamble or after a response request frame corresponding to the data is sent by the transmitter, and before the time for reaching the maximum cache capacity of the transmitter; or, sending, by the receiver, the ACK, to the transmitter, in a limited contention-free manner or by means of CSMA; and receiving, by the transmitter, on the second channel, the ACK corresponding to the data.

In conjunction with the second possible implementation of the third aspect, in a fourth possible implementation of the third aspect, there are multiple receivers, receiving, the data, sent by a transmitter on the first channel includes:

sending, by the transmitter, on the reserved first channel, the data, to the multiple receivers, by means of downlink multi-user transmission; and sending, on the reserved second channel, the ACK corresponding to the data, to the transmitter includes:

receiving, by the multiple receivers, on the first channel, the data;

in a case that all the multiple receivers support uplink multi-user transmission, sending, by the transmitter, on the reserved second channel, response request frames corresponding to the data, and after the response request frames are received by the multiple receivers, sending by the multiple receivers acknowledgements ACKs to the transmitter at the same time by means of uplink multi-user transmission before a minimum one of times for reaching maximum cache capacities of the transmitter for the multiple receivers; or, in a case the multiple receivers do not support the uplink multi-user transmission, after the response request frames are received by the multiple receivers, calculating, by the multiple receivers, the times for reaching the maximum cache capacities of the transmitter, corresponding to the multiple receivers, based on rates carried by the preamble at which the transmitter sends respectively the data to the multiple receivers, and before the times for reaching the maximum cache capacities of the transmitter corresponding to the multiple receivers, sending respectively by the multiple receivers the acknowledgements ACKs to the transmitter; or, sending respectively by the multiple receivers on the second channel the ACKs to the transmitter in a limited contention-free manner; and receiving, by the transmitter, on the second channel, the ACKs corresponding to the data, sent by the multiple receivers.

In conjunction with the second possible implementation of the third aspect, in a fifth possible implementation of the third aspect, there are multiple transmitters, receiving, the data, sent by a transmitter on the first channel includes:

sending, by the multiple transmitters, on the first channel, the data, to the receiver, by means of uplink multi-user transmission; and sending, on the reserved second channel, the ACK corresponding to the data, to the transmitter includes:

calculating, respectively, by the receiver, latest times for reaching maximum cache capacities of the multiple transmitters, corresponding to the multiple transmitters, based on rates carried by preambles at which the multiple transmitters send the data to the receiver, and before a minimum one of the times for reaching the maximum cache capacities of the multiple transmitters, sending by the receiver acknowledgements ACKs to the multiple transmitters at the same time by means of downlink multi-user transmission; or, sending respectively by the multiple transmitters latest times corresponding to the multiple transmitters to the receiver, receiving by the receiver the latest times, and before the minimum one of the times for reaching the maximum cache capacities of the multiple transmitters, sending by the receiver the acknowledgements ACKs to the multiple transmitters at the same time by means of downlink multi-user transmission; or, calculating, respectively, by the receiver, the times for reaching the maximum cache capacities of the multiple transmitters, corresponding to the multiple transmitters, based on the rates carried by the preambles at which the multiple transmitters send the data to the receiver, and before the times for reaching the maximum cache capacities of the multiple transmitters, sending respectively by the receiver the acknowledges ACKs to the multiple transmitters;

sending by the receiver on the second channel the ACKs to the multiple transmitters in a limited contention-free manner or by means of CSMA; and receiving, by the multiple transmitters, on the second channel, the ACKs corresponding to the data, sent by the receiver.

In conjunction with the second possible implementation of the third aspect, in a sixth possible implementation of the third aspect, there are multiple transmitters, there are multiple receivers, receiving, the data, sent by a transmitter on the first channel includes:

sending, by the multiple transmitters, on the first channel, the data, to the multiple receivers, by means of cooperative transmission; and sending, on the reserved second channel, the ACK corresponding to the data, to the transmitter includes:

sending, respectively, by the multiple transmitters, on the reserved second channel, response request frames corresponding to the data, by means of Poll, and after the response request frames are received by the plurality of receivers and after SIFS, sending by the multiple receivers ACKs to the multiple transmitters; or, requesting the multiple receivers to send the ACKs by the multiple transmitters respectively on the second channel in a limited contention-free manner; or, sending respectively by the multiple receivers the ACKs to the multiple transmitters in a limited contention-free manner; and receiving, by the multiple transmitters, on the second channel, the ACKs corresponding to the data, sent by the multiple receivers.

In conjunction with the third aspect, the first possible implementation of the third aspect, the second possible implementation of the third aspect, the third possible implementation of the third aspect, the fourth possible implementation of the third aspect, the fifth possible implementation of the third aspect or the sixth possible implementation of the third aspect, in a seventh possible implementation of the third aspect, the method further includes:

carrying, by the transmitter, starting time for channel reservation, in at least one of the first channel reservation frame and the second channel reservation frame, in the data or in the preamble.

In conjunction with the third aspect, the first possible implementation of the third aspect, the second possible implementation of the third aspect, the third possible implementation of the third aspect, the fourth possible implementation of the third aspect, the fifth possible implementation of the third aspect, the sixth possible implementation of the third aspect or the seventh possible implementation of the third aspect, in an eighth possible implementation of the first aspect, the method further includes:

sending, by the transmitter, an instruction for returning to a preset operating mode, to the receiver, in a case that at least one of the first channel and the second channel is not successfully reserved by the transmitter.

In a fourth aspect, a method for transmitting data is provided, which includes:

receiving, by a receiver, the data sent by a transmitter, and receiving, by the receiver, a maximum cache capacity sent by the transmitter, where the maximum cache capacity is used by the receiver to determine latest time for sending an acknowledgement ACK corresponding to the data to the transmitter.

In a fifth aspect, a transmitter is provided, which includes:

a reserving unit, configured to reserve a first channel and a second channel, where the first channel is used to transmit data and the second channel is used to transmit an acknowledgement ACK;

a sending unit, configured to send on the reserved first channel the data to a receiver; and a receiving unit, configured to receive on the reserved second channel the ACK corresponding to the data sent by the receiver.

In conjunction with the fifth aspect, in a first possible implementation of the fifth aspect, the reserving unit is configured to:

send on the first channel a first channel reservation frame to the receiver, and send on the second channel a second channel reservation frame to the receiver, where the first channel reservation frame is used to reserve the first channel and carry time for reserving the first channel, and the second channel reservation frame is used to reserve the second channel and carry time for reserving the second channel; and determine, whether the first channel is successfully reserved, based on at least one of a response frame of the first channel reservation frame and a response frame of the second channel reservation frame, sent by the receiver, and determine, by the transmitter, whether the second channel is successfully reserved, based on at least one of the response frame of the first channel reservation frame and the response frame of the second channel reservation frame, sent by the receiver.

In conjunction with the first possible implementation of the fifth aspect, in a second possible implementation of the fifth aspect, the transmitter further includes a carrying unit, where the carrying unit is configured to:

carry a maximum cache capacity in at least one of the first channel reservation frame and the second channel reservation frame, in a preamble or in a capability field, where the maximum cache capacity is used by the receiver to determine latest time for sending the ACK corresponding to the data to the transmitter.

In conjunction with the second possible implementation of the fifth aspect, in a third possible implementation of the fifth aspect, the sending unit is configured to:
send by the transmitter on the reserved first channel the data to the receiver; and the receiving unit is configured to:
calculate time for reaching the maximum cache capacity of the transmitter, based on a rate carried by the preamble at which the transmitter sends the data, or, receive by the receiver the time for reaching the maximum cache capacity of the transmitter sent by the transmitter;

send the ACK to the transmitter, after idle PIFS time of the second channel, after a SIFS time of the preamble or after a response request frame corresponding to the data is sent by the transmitter, and before the time for reaching the maximum cache capacity of the transmitter; or, send, by the receiver, the ACK to the transmitter in a limited contention-free manner or by means of CSMA; and receive on the second channel the ACK corresponding to the data.

In conjunction with the second possible implementation of the fifth aspect, in a fourth possible implementation of the fifth aspect, the sending unit is configured to:

send, on the reserved first channel, the data, to the multiple receivers, by means of downlink multi-user transmission; and the receiving unit is configured to:

receive the data on the first channel;

in a case that all the multiple receivers support uplink multi-user transmission, send, by the transmitter, response request frames corresponding to the data on the reserved second channel, and after the response request frames are received by the multiple receivers, send, by the plurality of receivers, acknowledgements ACKs to the transmitter at the same time by means of uplink multi-user transmission before a minimum one of times for reaching maximum cache capacities of the transmitter for the multiple receivers; or, in a case that the multiple receivers do not support the uplink multi-user transmission, after the response request frames are received by the multiple receivers, calculate, by the plurality of receivers, the times for reaching the maximum cache capacities of the transmitter corresponding to the multiple receivers, based on rates carried by the preamble at which the transmitter sends respectively the data to the multiple receivers, and before the times for reaching the maximum cache capacities of the transmitter corresponding to the multiple receivers, send respectively by the plurality of receivers the acknowledgements ACKs to the transmitter; or, send respectively by the plurality of receivers the ACKs on the second channel the ACKs to the transmitter in a limited contention-free manner; and receive, on the second channel, the ACKs corresponding to the data, sent by the multiple receivers.

In conjunction with the second possible implementation of the fifth aspect, in a fifth possible implementation of the fifth aspect, there are multiple transmitters, the sending units are configured to:

send, on the first channel, the data, to the same receiver, by means of uplink multi-user transmission; and the receiving units are configured to:

calculate respectively latest times for reaching maximum cache capacities of the multiple transmitters, corresponding to the multiple transmitters, based on rates carried by preambles at which the multiple transmitters send the data to the receiver, and before a minimum one of the times for reaching the maximum cache capacities of the multiple transmitters, send by the receiver acknowledgements ACKs to the multiple transmitters at the same time by means of downlink multi-user transmission; or, send respectively by the plurality of transmitters the latest times corresponding to the multiple transmitters to the receiver, receive by the receiver the latest times, and before the minimum one of the times for reaching the maximum cache capacities of the multiple transmitters, send by the receiver the acknowledgements ACKs to the multiple transmitters at the same time by means of downlink multi-user transmission; or, calculate respectively, by the receiver, the times for reaching the maximum cache capacities of the multiple transmitters, corresponding to the multiple transmitters, based on the rates carried by the preambles at which the multiple transmitters send the data to the receiver, and before the times for reaching the maximum cache capacities of the multiple transmitters, send respectively by the receiver the acknowledges ACKs to the multiple transmitters send the ACKs on the second channel to the multiple transmitters in a limited contention-free manner or by means of CSMA; and receive, on the second channel, the ACKs corresponding to the data, sent by the receiver.

In conjunction with the second possible implementation of the fifth aspect, in a sixth possible implementation of the fifth aspect, there are multiple transmitters, there are multiple receivers, the sending units are configured to:

send, on the first channel, the data, to the multiple receivers, by means of cooperative transmission; and the receiving units are configured to:

send respectively, on the reserved second channel, response request frames corresponding to the data by means of Poll, and after the response request frames are received by the plurality of receivers and after SIFS, send by the plurality of receivers ACKs to the multiple transmitters; or, request the multiple receivers to send the ACKs, by the multiple transmitters respectively on the second channel, in a limited contention-free manner; or, send respectively by the plurality of receivers the ACKs to the multiple transmitters in a limited contention-free manner; and receive, on the second channel, the ACKs corresponding to the data, sent by the multiple receivers.

In conjunction with the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect or the sixth possible implementation of the fifth aspect, in a seventh possible implementation of the fifth aspect, the carrying unit is further configured to:

carry by the transmitter starting time for channel reservation in at least one of the first channel reservation frame and the second channel reservation frame, in the data or in the preamble.

In conjunction with the fifth aspect, the first possible implementation of the fifth aspect, the second possible implementation of the fifth aspect, the third possible implementation of the fifth aspect, the fourth possible implementation of the fifth aspect, the fifth possible implementation of the fifth aspect, the sixth possible implementation of the fifth aspect or the seventh possible implementation of the fifth aspect, in an eighth possible implementation of the first aspect, the sending unit is further configured to:

send by the transmitter an instruction for returning to a preset operating mode to the receiver, in a case that at least one of the first channel and the second channel is not successfully reserved by the transmitter.

In a sixth aspect, a transmitter is provided, which includes:

a sending unit, configured to send data and a maximum cache capacity to a receiver, where the maximum cache capacity is used by the receiver to determine latest time for sending an acknowledgement ACK corresponding to the data to the transmitter; and a receiving unit, configured to receive the ACK, sent by the receiver based on the maximum cache capacity.

In a seventh aspect, a receiver is provided, which includes:

a reserving unit, configured to reserve a first channel and a second channel, where the first channel is used to transmit data and the second channel is used to transmit an acknowledgement ACK;

a receiving unit, configured to receive the data, sent by a transmitter on the first channel; and a sending unit, configured to send on the second channel the ACK corresponding to the data to the transmitter.

In conjunction with the seventh aspect, in a first possible implementation of the seventh aspect, the reserving unit is configured to:

receive on the first channel a first channel reservation frame sent by the transmitter, and receive on the second channel a second channel reservation frame sent by the transmitter, where the first channel reservation frame is used to reserve the first channel and carry time for reserving the first channel, and the second channel reservation frame is used to reserve the second channel and carry time for reserving the second channel; and send, at least one of a response frame of the first channel reservation frame and a response frame of the second channel reservation frame, to the transmitter, so as to enable the transmitter to determine whether the first channel is successfully reserved based on the at least one of the response frame of the first channel reservation frame and the response frame of the second channel reservation frame sent by the receiver, and to enable the transmitter to determine whether the second channel is successfully reserved based on the at least one of the response frame of the first channel reservation frame and the response frame of the second channel reservation frame sent by the receiver.

In conjunction with the first possible implementation of the seventh aspect, in a second possible implementation of the seventh aspect, the reserving unit is configured to:

carry a maximum cache capacity in at least one of the first channel reservation frame and the second channel reservation frame, in a preamble or in a capability field, where the maximum cache capacity is used by the receiver to determine latest time for sending the ACK corresponding to the data to the transmitter.

In conjunction with the second possible implementation of the seventh aspect, in a third possible implementation of the seventh aspect, the sending unit is configured to:

calculate time for reaching the maximum cache capacity of the transmitter, based on a rate carried by the preamble at which the transmitter sends the data, or, receive, by the receiver the time for reaching the maximum cache capacity of the transmitter sent by the transmitter;

send the ACK to the transmitter, after idle PIFS time of the second channel, after SIFS time of the preamble or after a response request frame corresponding to the data is sent by the transmitter, and before the time for reaching the maximum cache capacity of the transmitter; or, send, by the receiver, the ACK to the transmitter in a limited contention-free manner or by means of C SMA; and receive on the second channel the ACK corresponding to the data.

In conjunction with the second possible implementation of the seventh aspect, in a fourth possible implementation of the seventh aspect, there are multiple receivers, the sending units are configured to:

in a case that all the multiple receivers support uplink multi-user transmission, response request frames corresponding to the data are sent on the reserved second channel, and after the response request frames are received by the plurality of receivers, send acknowledgements ACKs to the transmitter at the same time by means of uplink multi-user transmission before a minimum one of times for reaching maximum cache capacities of the transmitter for the multiple receivers; or, in a case that the multiple receivers do not support the uplink multi-user transmission, after the response request frames are received by the multiple receivers, calculate, by the plurality of receivers, the times for reaching the maximum cache capacities of the transmitter corresponding to the multiple receivers, based on rates carried by the preamble at which the transmitter sends respectively the data to the multiple receivers, and before the times for reaching the maximum cache capacities of the transmitter corresponding to the multiple receivers, sending respectively the acknowledgements ACKs to the transmitter; or, send respectively, the ACKs on the second channel to the transmitter in a limited contention-free manner; and receive, on the second channel, the ACKs corresponding to the data, sent by the multiple receivers.

In conjunction with the second possible implementation of the seventh aspect, in a fifth possible implementation of the seventh aspect, there are multiple transmitters, the sending unit is configured to:

calculate respectively latest times for reaching maximum cache capacities of the multiple transmitters, corresponding to the multiple transmitters, based on rates carried by preambles at which the multiple transmitters send data to the receiver, and before a minimum one of the times for reaching the maximum cache capacities of the multiple transmitters, send acknowledgements ACKs to the multiple transmitters at the same time by means of downlink multi-user transmission; or, send respectively by the plurality of transmitters latest times corresponding to the multiple transmitters to the receiver, receive by the receiver the latest times, and before the minimum one of the times for reaching the maximum cache capacities of the multiple transmitters, send the acknowledgements ACKs to the multiple transmitters at the same time by means of downlink multi-user transmission; or, calculate respectively, by the receiver, the times for reaching the maximum cache capacities of the multiple transmitters, corresponding to the multiple transmitters, based on the rates carried by the preambles at which the multiple transmitters send the data to the receiver, and before the times for reaching the maximum cache capacities of the multiple transmitters, send respectively by the receiver the acknowledges ACKs to the multiple transmitters send the ACKs on the second channel to the multiple transmitters in a limited contention-free manner or by means of CSMA; and receive, on the second channel, the ACKs corresponding to the data, sent by the receiver.

In conjunction with the second possible implementation of the seventh aspect, in a sixth possible implementation of the seventh aspect, there are multiple transmitters, there are multiple receivers, the sending units are configured to:

send respectively response request frames corresponding to the data, on the reserved second channel, by means of Poll, and after the response request frames are received by the plurality of receivers and after SIFS, send, by the plurality of receivers, ACKs to the multiple transmitters; or, request the multiple receivers to send the ACKs by the multiple transmitters respectively on the second channel, in a limited contention-free manner; or, send respectively by the plurality of receivers the ACKs to the multiple transmitters in a limited contention-free manner; and receive, on the second channel, the ACKs corresponding to the data, sent by the multiple receivers.

In conjunction with the seventh aspect, the first possible implementation of the seventh aspect, the second possible implementation of the seventh aspect, the third possible implementation of the seventh aspect, the fourth possible implementation of the seventh aspect, the fifth possible implementation of the seventh aspect or the sixth possible implementation of the seventh aspect, in a seventh possible implementation of the seventh aspect, the carrying unit is further configured to:

carry starting time for channel reservation in at least one of the first channel reservation frame and the second channel reservation frame, in the data or in the preamble.

In conjunction with the seventh aspect, the first possible implementation of the seventh aspect, the second possible implementation of the seventh aspect, the third possible implementation of the seventh aspect, the fourth possible implementation of the seventh aspect, the fifth possible implementation of the seventh aspect, the sixth possible implementation of the seventh aspect or the seventh possible implementation of the seventh aspect, in an eighth possible implementation of the first aspect, the sending unit is further configured to:

send an instruction for returning to a preset operating mode to the receiver, in a case that at least one of the first channel and the second channel is not successfully reserved by the transmitter.

In an eighth aspect, a receiver is provided, which includes:

a receiving unit, configured to receive data sent by a transmitter, and receive a maximum cache capacity sent by the transmitter, where the maximum cache capacity is used by the receiver to determine latest time for sending an acknowledgement ACK corresponding to the data to the transmitter.

In a ninth aspect, a communication system is provided, which includes a transmitter according to the fifth aspect and a receiver according to the seventh aspect.

In a tenth aspect, a communication system is provided, which includes a transmitter according to the sixth aspect and a receiver according to the eighth aspect.

Compared with the conventional technology, based on embodiments of the present disclosure, the first channel and the second channel are reserved, where the first channel is used to transmit the data and the second channel is used to transmit the ACK; the data is sent on the reserved first channel to the receiver; the ACK corresponding to the data sent by the receiver is received on the reserved second channel, and it is determined based on information carried in the ACK whether the data needs to be cached; and in a case that the information carried in the ACK indicates that the data is correctly received by the receiver, the data cached by the transmitter is cleared. By separately transmitting the data and the ACK, the problem that how to improve the efficiency of the MAC in the wireless system in a case of the limited cache capacity of the transmitter is solved.

BRIEF DESCRIPTION OF THE DRAWINGS

In order to more clearly illustrate technical solutions in embodiments of the present disclosure, drawings used in the embodiments are introduced briefly hereinafter. Apparently, the drawings described in the following illustrates some embodiments of the present disclosure, other drawings may be obtained by those ordinarily skilled in the art based on these drawings without any creative efforts.

DETAILED DESCRIPTION OF THE EMBODIMENTS

In order to make the goal, the technical solutions, and the advantages of embodiments of the present disclosure more clear, the present disclosure is described in detail hereinafter in conjunction with the drawings and the embodiments. It should be understood that, the embodiments described herein are only used to explain the present disclosure, and are not used to limit the present disclosure.

The following descriptions are only preferred embodiments of the present disclosure, and are not used to limit the present disclosure, and various changes, equivalents and modifications which do not depart from the spirit and principle of the present disclosure fall within the protection scope of the present disclosure.

Figure 1:
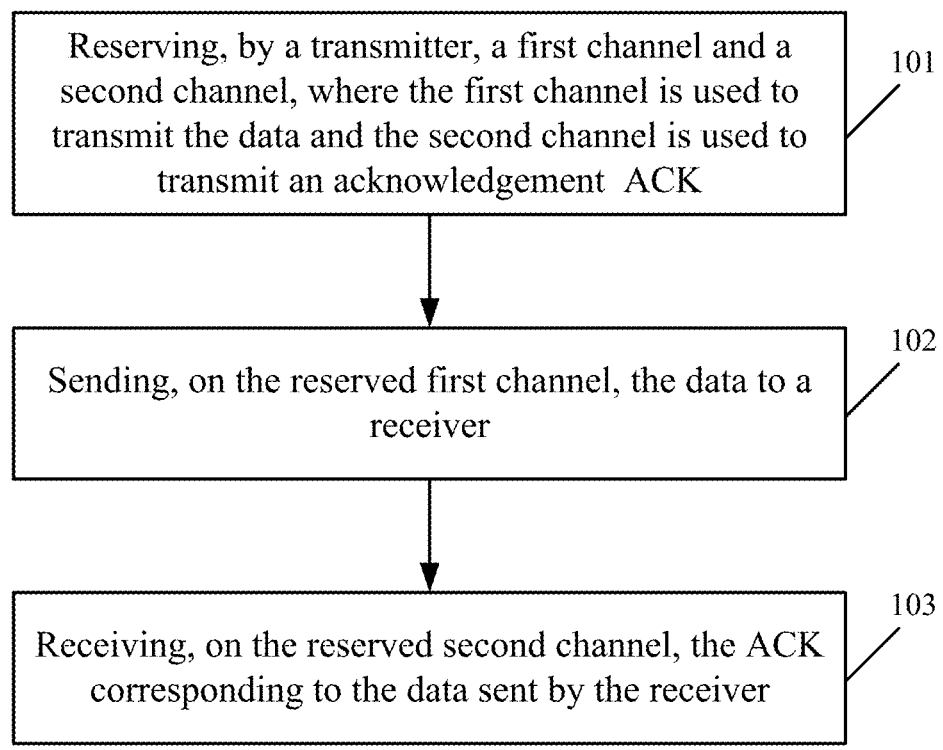
FIG. 1 is a flow chart of a method for transmitting data according to an embodiment of the present disclosure.

Reference is made to FIG. 1, which is a flow chart of a method for transmitting data according to an embodiment of the present disclosure. As shown in FIG. 1, the method includes the following steps.

In step 101, a first channel and a second channel is reserved by a transmitter, where the first channel is used to transmit the data and the second channel is used to transmit an acknowledgement ACK.

In a specific implementation, the first channel may be a single channel, or multiple continuous or discrete channels; in a specific implementation, the second channel may be a fixed channel of the basic service set (BSS) which is specialized for transmitting the ACK, a fixed channel of the BSS which is used to transmitting control frames or management frames (primary channel), or, a temporary channel which is determined to be usable based on a channel reservation frame before transmitting data. The channel is released immediately after use. In a case of an OBSS, the second channel may be used by multiple BSSs, so as to further reduce system efficiency.

Optionally, reserving by a transmitter a first channel and a second channel includes:

sending by the transmitter on the first channel a first channel reservation frame to a receiver, and sending by the transmitter on the second channel a second channel reservation frame to the receiver, at the same time, where the first channel reservation frame is used to reserve the first channel and carry time for reserving the first channel, and the second channel reservation frame is used to reserve the second channel and carry time for reserving the second channel; and determining by the transmitter whether the first channel is successfully reserved, based on at least one of a response frame of the first channel reservation frame and a response frame of the second channel reservation frame, sent by the receiver, and determining by the transmitter whether the second channel is successfully reserved, based on at least one of the response frame of the first channel reservation frame and the response frame of the second channel reservation frame, sent by the receiver.

Specifically, in a case that the response frame of the first channel reservation frame sent by the receiver is received by the transmitter on the first channel, the first channel is successfully reserved by the transmitter; in a case that the response frame of the second channel reservation frame sent by the receiver is received by the transmitter on the second channel, the second channel is successfully reserved by the transmitter. In a case that the response frame of the first channel reservation frame, sent by the receiver and received on the first channel by the transmitter, indicates that a response frame is also sent by the receiver on the second channel, the first channel and the second channel are successfully reserved by the transmitter; in a case that the response frame of the second channel reservation frame, sent by the receiver and received on the second channel by the transmitter, indicates that a response frame is also sent by the receiver on the first channel, the second channel and the first channel are successfully reserved by the transmitter.

Figure 2:
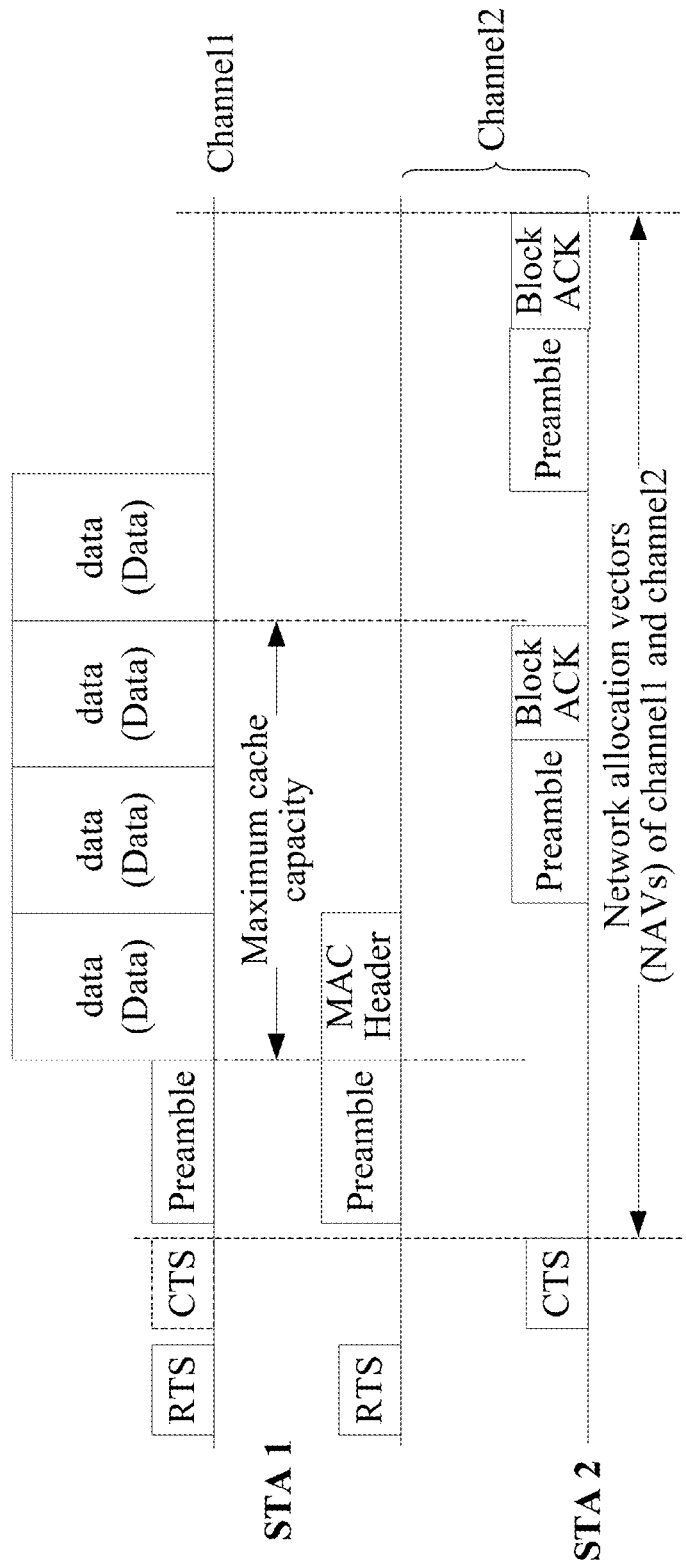
FIG. 2 is a schematic diagram of a method for reserving channels according to an embodiment of the present disclosure.

Specifically, reference is made to FIG. 2, which is a schematic diagram of a method for reserving channels according to an embodiment of the present disclosure. As shown in FIG. 2, a station (STA) 1 is a transmitter, a STA2 is a receiver, a Channel1 is a first channel used to transmit the data and a Channel2 is a second channel used to send the ACK.

The channel reservation frames RTSs are sent by the STA1 on the Channel1 and the Channel2 at the same time. The request to send (RTS) on the different channels may be the same or not. In a case that the first RTS is sent on the Channel1, the time for reserving the Channel1 is carried by the first RTS; and in a case that the second RTS is sent on the Channel2, the time for reserving the Channel2 is carried by the second RTS. In addition, identifiers of sub-channels on which other RTSs are sent at the same time are also carried by the RTS, so as to enable the receiver for the RTSs to obtain all the sub-channels sending the RTSs more reliably. In a case that the first channel and the second are successfully reserved, Clear to send (CTS) is sent by the STA2 on at least one of the Channel1 and the Channel2 to the STA1, the time for reserving the channels may be carried in the RTSs, the CTS, the Data or the ACK.

In a case that the response frames of the RTSs are sent by the STA2 on the Channel1 and the Channel2 at the same time, the Channel1 and the Channel2 are successfully reserved by the STA1; in a case that the STA2 responds on only one of the Channel1 and the Channel2, only one of the Channel1 and the Channel2 is successfully reserved; and in a case that the STA2 makes no response, no channel is successfully reserved by the STA1.

The method further includes:

carrying, by the transmitter, a maximum cache capacity, in at least one of the first channel reservation frame and the second channel reservation frame or in a capability field, where the maximum cache capacity is used by the receiver to determine latest time for sending the ACK corresponding to the data to the transmitter.

An interaction of the capacity field may be performed between the receiver STA and the transmitter STA before the data is sent.

In the conventional technology, in order to support reliable transmission of a data packet, a repeated transmission mechanism is needed. In a repeated transmission, before it is determined by the transmitter that signals are correctly received by the receiver for receiving the data, the data needs to be cached. Therefore, as a length of the data packet increases, the transmitter and the receiver need to have sufficiently large caches, so as to ensure that the data can be cached by the transmitter after the data is sent and before the acknowledgement (ACK) is correctly received. In practice, in consideration of a size of a chip, capacities of the caches are limited. Therefore, it is a problem to be solved that how to avoid the data being lost due to the limited caches.

As another possible implementation, on the basis of the conventional technology, the data and the maximum cache capacity are sent by the transmitter to the receiver, the maximum cache capacity is used by the receiver to determine the latest time for sending the ACK corresponding to the data to the transmitter, and the ACK may be sent by the receiver to the transmitter before the latest time, thereby solving the problem in the conventional technology that the data is lost due to the limited caches.

In step 102, the data is sent by the transmitter on the reserved first channel to the receiver.

In step 103, the ACK corresponding to the data, sent by the receiver, is received by the transmitter on the reserved second channel.

Optionally, sending on the reserved first channel the data to the receiver includes:

sending by the transmitter on the reserved first channel the data to the receiver.

Specifically, reference is made to FIG. 2, in a case that the Channel1 and the Channel2 are successfully reserved by the STA1, then Data is sent by the STA1 on the Channel1 to the STA2.

Receiving on the reserved second channel the ACK corresponding to the data sent by the receiver includes:

calculating, by the receiver, the time for reaching the maximum cache capacity of the transmitter, based on a rate carried by the preamble at which the transmitter sends the data, or, receiving, by the receiver, the time for reaching the maximum cache capacity of the transmitter, sent by the transmitter.

Specifically, in a case that the maximum cache capacity carried by the transmitter is in a form of a cache capacity value, the time T for reaching the maximum cache capacity of the STA1 is calculated by the STA2, based on the rate carried by the preamble at which the STA1 sends the data to the STA2 and the maximum cache capacity of the STA1. That is, if the maximum cache capacity of the transmitter is C bits and the rate carried by the preamble is R bit/second, the latest time is calculated by the receiver: T=C/R, based on the maximum cache capacity. In a case that the maximum cache capacity carried by the STA1 is in a form of the latest time T, the T sent by the STA1 is directly received by the STA2.

The ACK is sent by the receiver to the transmitter, after idle PCF inter-frame space (PIFS) time of the second channel, after short inter-frame space (SIFS) time of the preamble or after a response request frame corresponding to the data is sent by the transmitter, and before the time for reaching the maximum cache capacity of the transmitter; or, the ACK is sent by the receiver to the transmitter in a limited contention-free manner or by means of CSMA.

The limited contention-free manner refers to that a specified STA occupies the second channel by means of carrier sense multiple access with collision avoidance (CSMA/CA) to perform sending, in a time period.

Specifically, the CSMA/CA is a channel contention method, it is sensed by the STA2 whether the second channel is idle, the STA2 waits for the idle time of the second channel to be a distributed interframe space (DIFS). When it is sensed by the STA2 that the second channel is not occupied, a time value which is a back off time is randomly generated, and the ACK corresponding to the data is sent by the STA2 on the second channel to the STA1.

The ACK corresponding to the data is received by the transmitter on the second channel.

Optionally, sending on the reserved first channel the data to the receiver includes:

sending by the transmitter on the reserved first channel the data to the multiple receivers by means of downlink multi-user transmission.

Figure 3:
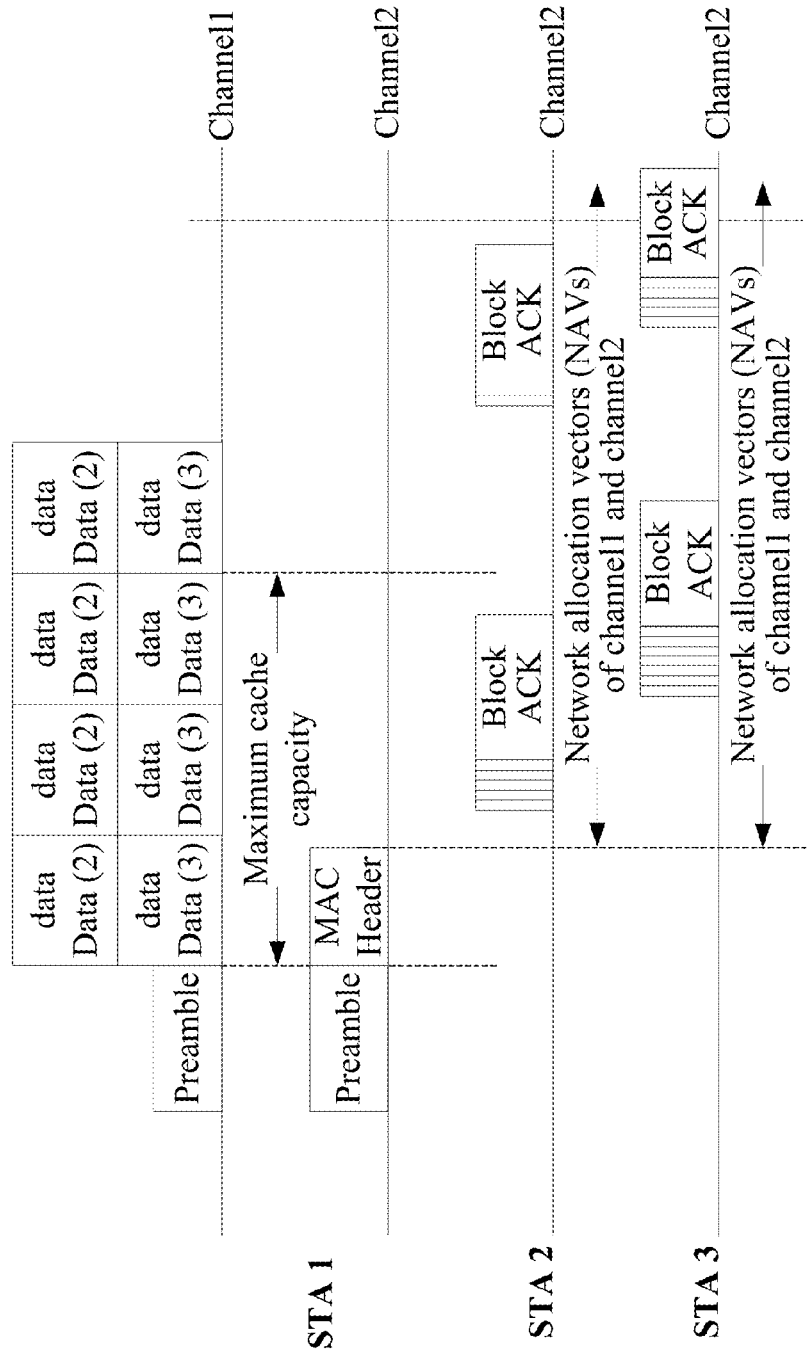
FIG. 3 is a schematic diagram of a method for transmitting data according to an embodiment of the present disclosure.

Specifically, reference is made to FIG. 3, which is a schematic diagram of a method for transmitting data according to an embodiment of the present disclosure. As shown in FIG. 3, it is assumed that Data (2) and Data (3) are sent by the STA1 to the STA2 and STA3 respectively at the same time by means of downlink multi-user transmission. The means of multi-user transmission may be downlink multi-user multiple input multiple output, (MIMO) or downlink orthogonal frequency division multiplexing access (OFDMA), which is not limited herein.

Receiving on the reserved second channel the ACK corresponding to the data sent by the receiver includes:

receiving by the multiple receivers the data on the first channel;

in a case that all the multiple receivers support uplink multi-user transmission, sending, by the transmitter, response request frames corresponding to the data on the reserved second channel, and after the response request frames are received by the multiple receivers, sending, by the multiple receivers, acknowledgements ACKs to the transmitter at the same time by means of uplink multi-user transmission before a minimum one of the times for reaching maximum cache capacities of the transmitter for the multiple receivers.

Specifically, in a case that the maximum cache capacities carried by the transmitter are in a form of a cache capacity value, the times for reaching the maximum cache capacities of the transmitter corresponding to the multiple receivers are calculated by the multiple receiver, based on the rates carried by the preambles at which the transmitter sends the data to the multiple receivers respectively. Or, in a case that latest times for the multiple receivers to send respectively the ACKs corresponding to the data to the transmitter are sent by the transmitter to the multiple receivers, the latest times are respectively received by the multiple receivers.

Specifically, in a case that the maximum cache capacities are respectively specified for each user, based on a rate R(2) at which the STA1 sends the Data(2) to the STA2 and a maximum capacity C(2) of the cache of the STA1 for the STA2, the STA2 may calculate the time for reaching the maximum cache capacity of the STA1: T2=C(2)/R(2), and based on a rate R(3) at which the STA1 sends the Data(3) to the STA3 and a maximum capacity C(3) of the cache of the STA1 for the STA3, the STA3 may calculate the time for reaching the maximum cache capacity of the STA1: T3=C(3)/R(3). The T2 and the T3 are compared. In a case that the T2 is less than the T3, the response frames of the Data(2) and the Data(3) are sent by the STA2 and the STA3 on the second channel to the STA1 at the same time before T2; in a case that the T2 is greater than the T3, the response frames of the Data (2) and the Data(3) are sent by the STA2 and the STA3 on the second channel to the STA1 at the same time before T3. In a case that the maximum cache capacity C is specified for all users, based on the rate R(2) at which the STA1 sends the Data(2) and the rate R(3) at which the STA1 sends the Data(3), the STA2 and the STA3 may calculate the time for reaching the maximum cache capacity: T=C/(R(2)+R(3)).

In a case the multiple receivers do not support the uplink multi-user transmission, after the response request frames are received by the multiple receivers, the times for reaching the maximum cache capacities of the transmitter, corresponding to the multiple receivers, are calculated by the multiple receivers, based on the rates carried by the preambles at which the transmitter sends respectively the data to the multiple receivers, and before the times for reaching the maximum cache capacities of the transmitter corresponding to the multiple receivers, the acknowledgements ACKs are sent respectively by the multiple receivers to the transmitter; or, Specifically, in a case that the STA2 and the STA3 do not support the uplink multi-user transmission, then the T2 and the T3 are respectively calculated by the STA2 and the STA3, an ACK is sent by the STA2 to the STA1 before the T2, and an ACK is sent by the STA3 to the STA1 before T3.

The ACKs are sent by the multiple receivers on the second channel to the transmitter in a limited contention-free manner.

The limited contention-free manner refers to that a specified STA occupies the second channel by means of carrier sense multiple access with collision avoidance (CSMA/CA) to perform sending, in a time period. In the embodiment, the specified STA refers to multiple receivers in downlink multi-user transmission; and the time period refers to the length of time for reserving the second channel by the transmitter.

Specifically, the STA2 and the STA3 sense the second channel and generate a first random number A and a second random number B respectively. The first ransom number A is successively decreased in a case that it is sensed by the STA2 that the second channel is not occupied, and the ransom number B is successively decreased in a case that it is sensed by the STA3 that the second channel is not occupied. An acknowledgement ACK is sent by the STA2 to the STA1 when the first ransom number A is decreased to 0, and an acknowledgement ACK is sent by the STA3 to the STA1 when the second ransom number B is decreased to 0.

The ACKs corresponding to the data, sent by the receivers, are received by the transmitter on the second channel.

Optionally, sending on the reserved first channel the data to the receiver includes:

sending by multiple transmitters on the first channel the data to the same receiver by means of uplink multi-user transmission.

Figure 4:
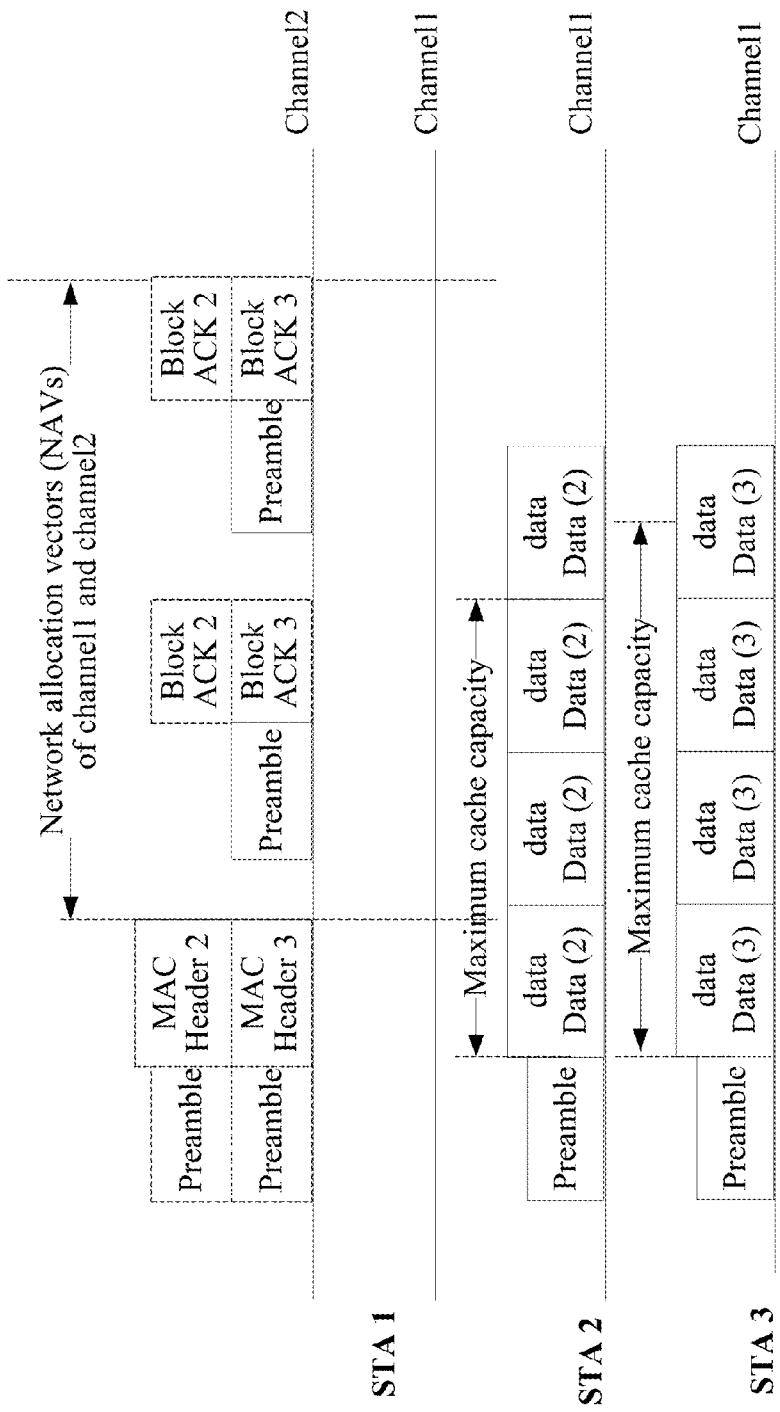
FIG. 4 is a schematic diagram of a method for transmitting data according to an embodiment of the present disclosure.

Specifically, reference is made to FIG. 4, which is a schematic diagram of a method for transmitting data according to an embodiment of the present disclosure. In FIG. 4, the STA2 and the STA3 are transmitters, and the STA1 is a receiver. The Data(2) is sent by the STA2 to the STA1, and the Data(3) is sent by the STA3 to the STA1.

Receiving on the reserved second channel the ACK corresponding to the data sent by the receiver includes:

Latest times for reaching maximum cache capacities of the multiple transmitters, corresponding to the multiple transmitters, are respectively calculated by the receiver, based on rates carried by preambles at which the multiple transmitters send the data to the receiver, and before a minimum one of the times for reaching the maximum cache capacities of the multiple transmitters, acknowledgements ACKs are sent by the receiver to the multiple transmitters at the same time by means of downlink multi-user transmission; or, the latest times corresponding to the multiple transmitters are sent respectively by the multiple transmitters to the receiver, and the latest times are received by the receiver, and before the minimum one of the times for reaching the maximum cache capacities of the plurality of transmitters, the receiver sends the acknowledgements, ACKs, to the plurality of transmitters at the same time by means of downlink multi-user transmission; or, the times for reaching the maximum cache capacities of the multiple transmitters, corresponding to the multiple transmitters, are calculated respectively by the receiver, based on the rates carried by preambles at which the multiple transmitters send the data to the receiver, and before the times for reaching the maximum cache capacities of the multiple transmitters, the acknowledges ACKs are sent respectively by the receiver to the multiple transmitters.

Specifically, based on a rate $R(2)$ at which the STA2 sends the data and the maximum cache capacity $C(2)$ of the STA2, the STA1 may calculate the time for reaching the maximum cache capacity of the STA2: $T2=C(2)/R(2)$, and based on a rate $R(3)$ at which the STA3 sends the data and the maximum cache capacity $C(3)$ of the STA3, the STA1 may calculate the time for reaching the maximum cache capacity of the STA3: $T3=C(3)/R(3)$. The T2 and the T3 are compared by the STA1, in a case that the T2 is less than the T3, the ACKs are sent by the STA1 to the STA2 and the STA3 before the T2, and in a case that the T3 is less than the T2, the ACKs are sent by the STA1 to the STA2 and the STA3 before the T3.

Specifically, the time T2 for reaching the maximum cache capacity of the STA2 is calculated by the STA1 based on the rate at which the STA2 sends the data and the maximum cache capacity of the STA2, the time T3 for reaching the maximum cache capacity of the STA3 is calculated by the STA1 based on the rate at which the STA3 sends the data and the maximum cache capacity of the STA3. An ACK is sent by the STA1 to the STA2 before the T2, and an ACK is sent by the STA1 to the STA3 before the T3.

The ACKs are sent by the receiver on the second channel to the transmitters in a limited contention-free manner or by means of CSMA.

There may be other devices using the second channel in a practical application scenario. Although there is only one receiver using the second channel to send the ACKs to the transmitters in this embodiment, the ACKs are sent by the receiver to the transmitters in a limited contention-free manner, so as to avoid that the second channel is used by the receiver and other devices together.

The ACKs corresponding to the data, sent by the receiver, are received by the multiple transmitters on the second channel.

Optionally, sending on the reserved first channel the data to the receiver includes:

sending by multiple transmitters on the first channel the data to multiple receivers by means of cooperative transmission.

The cooperative transmission may be joint transmission (JT) in which all data information and channel information are shared, coordinated transmission in which channel information is shared and data information is not shared, or interference alignment, which is not limited herein.

Figure 5:
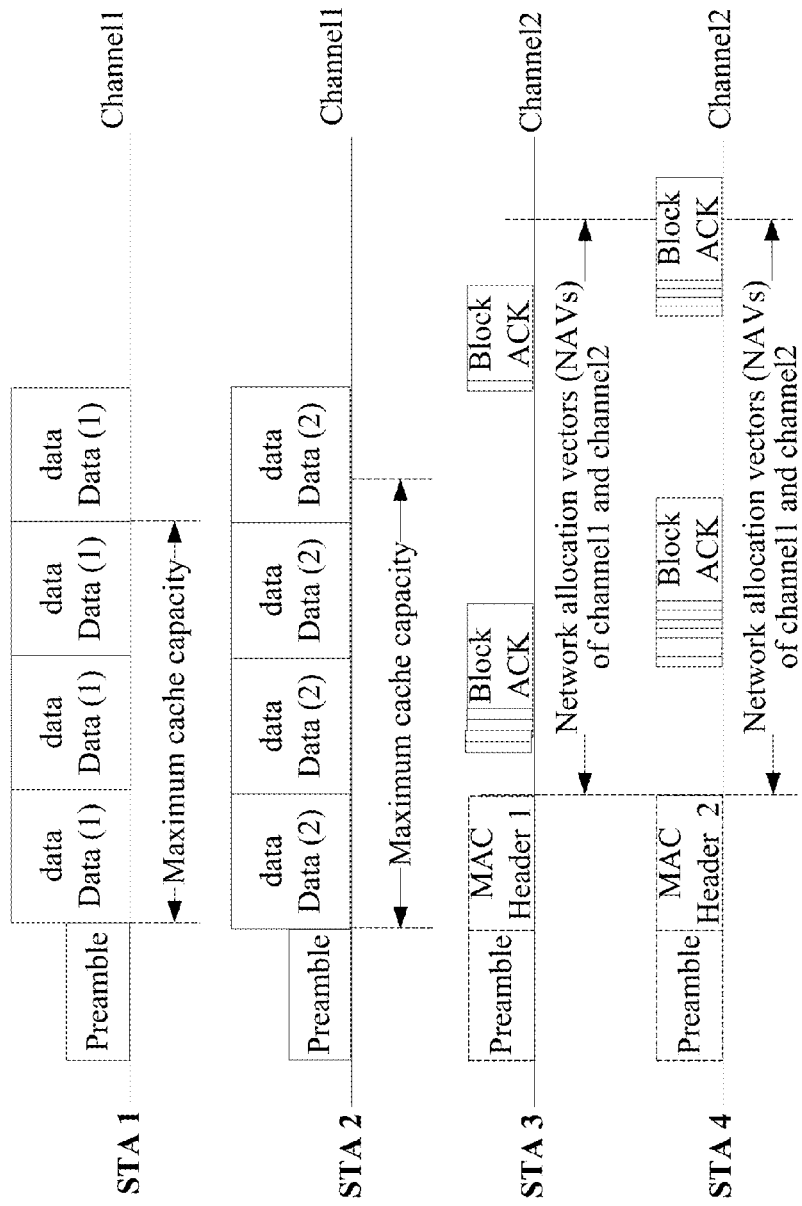
FIG. 5 is a schematic diagram of a method for transmitting data according to an embodiment of the present disclosure.

Specifically, reference is made to FIG. 5, which is schematic diagram of a method for transmitting data according to an embodiment of the present disclosure. The Data(1) is sent by the STA1 to the STA3, and the Data(2) is sent by the STA2 to the STA4.

Receiving, on the reserved second channel, the ACK corresponding to the data sent by the receiver includes:

sending respectively by multiple transmitters response request frames corresponding to the data on the reserved second channel by means of Poll, and after the response request frames are received by multiple receivers and after SIFS, ACKs are sent by the multiple receivers to the multiple transmitters.

Specifically, the response request frame corresponding to the Data(1) is sent by the STA1 on the second channel to the STA3, and the response request frame corresponding to the Data(2) is sent by the STA2 on the second channel to the STA4. An ACK is sent by the STA3 to the STA1, after the response request frame corresponding to the Data(1) is received and after SIFS; and an ACK is sent by the STA4 to the STA2, after the response request frame corresponding to the Data(2) is received and after SIFS.

The sequence of poll for sending is determined by the multiple transmitters based on interaction of maximum cache capacity information among them.

Or, the receivers are requested by the multiple transmitters respectively on the second channel to send the ACKs, in a limited contention-free manner.

Specifically, the STA1 and the STA2 sense the second channel and generate a first random number A and a second random number B respectively, the first ransom number A is successively decreased in a case that it is sensed by the STA1 that the second channel is not occupied, and the ransom number B is successively decreased in a case that it is sensed by the STA2 that the second channel is not occupied. A response request frame is sent by the STA1 to the STA3 when the first ransom number A is decreased to 0, and a response request frame is sent by the STA2 to the STA4 when the second ransom number B is decreased to 0.

Or, the ACKs are sent by the multiple receivers to the transmitters in a limited contention-free manner.

The limited contention-free manner refers to that a specified STA occupies the second channel by means of CSMA/CA to perform sending, in a time period. In the embodiment, the specified STA refers to multiple receivers in coordinated transmission; and the time period refers to the length of time for reserving the second channel by the transmitters.

Specifically, the STA3 and the STA4 sense the second channel and generate a first random number A and a second random number B respectively, the first ransom number A is successively decreased in a case that it is sensed by the STA3 that the second channel is not occupied, and the ransom number B is successively decreased in a case that it is sensed by the STA4 that the second channel is not occupied. An acknowledgement ACK is sent by the STA3 to the STA1 when the first ransom number A is decreased to 0, and an acknowledgement ACK is sent by the STA4 to the STA2 when the second ransom number B is decreased to 0.

The ACKs corresponding to the data, sent by the multiple receivers, are received by the multiple transmitters on the second channel.

In a case that the ACKs corresponding to the data sent by the receivers are received by the transmitters, then it is determined whether the data in the caches of the transmitters need to be cleared, based on contents of the ACKs. In a case that the contents of the ACKs indicate that the data is correctly received by the receivers, the correctly received data is cleared by the transmitters; and in a case that the contents of the ACKs indicate that the data is not correctly received by the receivers, the data is re-transmitted by the transmitters.

After the step 103, the transmitters have sent the data on the first channel, and then continue to request or wait for the ACKs on the second channel, until all the data acknowledge frames are received or the times for reserving the channels are over; and the receivers send the data acknowledge frames on the second channel, until all the data acknowledge frames are sent or the times for reserving are over.

As an optional embodiment, the method further includes:

carrying, by the transmitter, starting time for channel reservation, in at least one of the first channel reservation frame and the second channel reservation frame, in the data or in the preamble.

Figure 6:
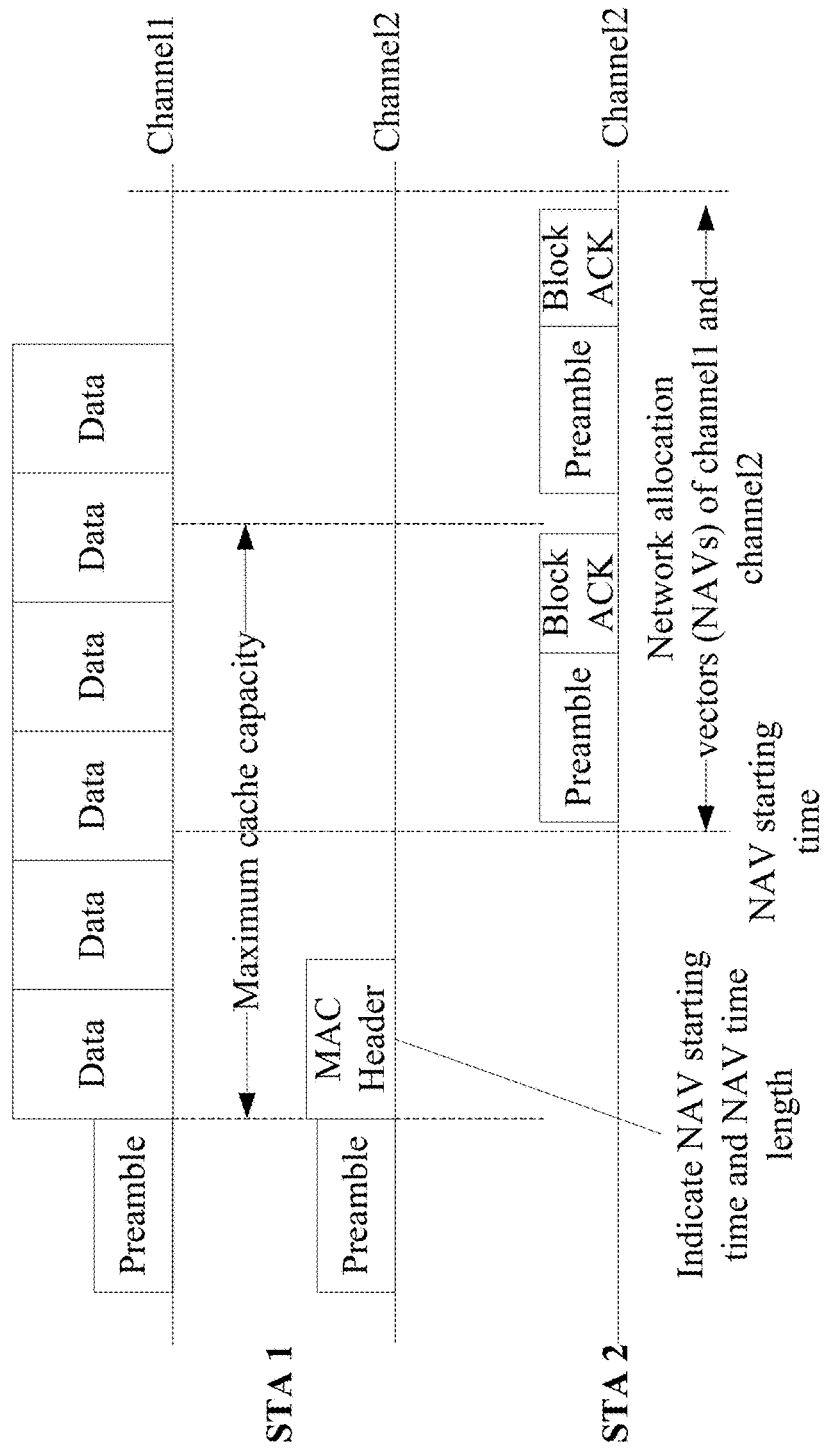
FIG. 6 is a schematic diagram of a method for transmitting data according to an embodiment of the present disclosure.

Specifically, reference is made to FIG. 6, which is a schematic diagram of a method for transmitting data according to an embodiment of the present disclosure. As shown in FIG. 6, the transmitter STA1 makes the MAC Header to carry information of the time for the STA1 to start to reserve a channel, on which the MAC Header is located, and information of the length of the time for the reserving, and a response frame of the data sent by the receiver STA2 is received by the STA1 on the channel during the time; an ACK is sent by the receiver STA2 on the second channel based on the time for starting to reserve the channel; and before the time for starting to reserve the channel, the second channel may be used by other STAs to transmit data. Since the channel is reserved by the STA1 after the time for starting to reserve the channel, network allocation vectors (NAV) are set to nonzero values for other STAs except the transmitter STA and the receiver STA, and the other STAs cannot transmit data on the channel during the time period indicated by the values of the NAVs.

The information of the time for the transmitter STA to start to reserve the channel, on which the MAC Header is located, and the information of the length of the time for the reserving, may also be carried in the channel reservation frame sent by the transmitter STA or in the preamble.

As an optional embodiment, the method further includes:

sending, by the transmitter, an instruction for returning to a preset operating mode, to the receiver, in a case that at least one of the first channel and the second channel is not successfully reserved by the transmitter.

Specifically, in a case that the second channel is not successfully reserved when the transmitter reserves the channel or starts to transmit the data, for example, no response of the channel reservation frame is obtained in a fixed time after the channel reservation frame is sent on the second channel, then transmitter needs to instruct the receiver to return to an initial operating mode.

A method for instructing the receiver to return to the initial operating mode may include: indicating that the second channel will no longer be used in the subsequent data transmission.

The initial operating mode refers to that a response of the receiver to the data is received by the transmitter on the first channel after SIFS for sending the data on the first channel.

Figure 7:
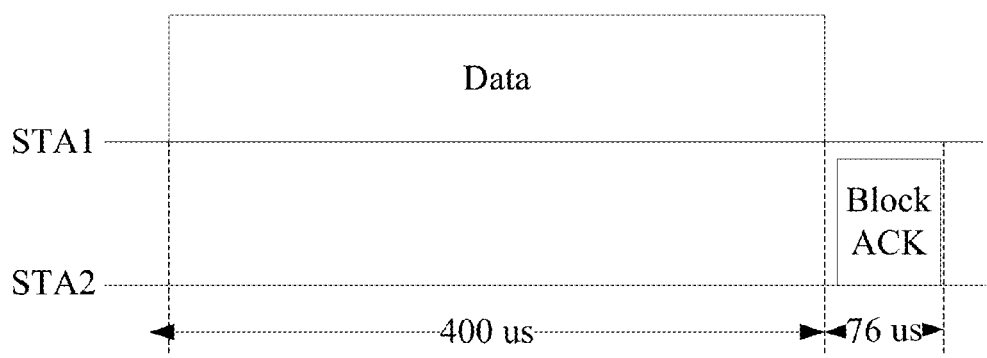
FIG. 7 is a schematic diagram of efficiency for transmitting data in the conventional technology.
Figure 8:
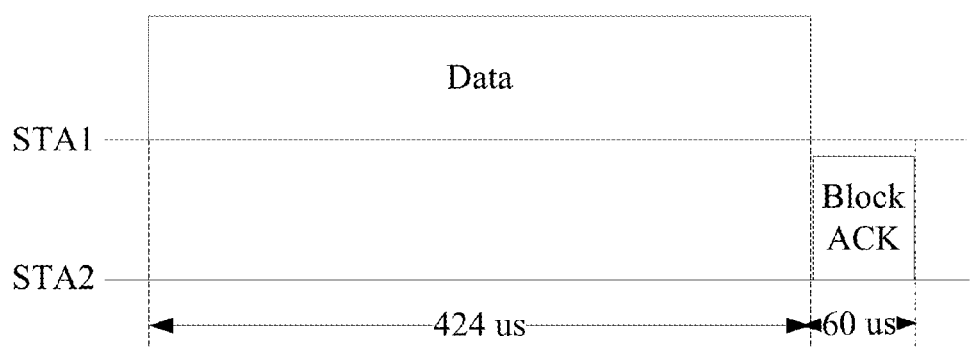
FIG. 8 is a schematic diagram for providing efficiency of communication efficiency according to an embodiment of the present disclosure.

Reference is made to FIG. 7, which is a schematic diagram illustrating efficiency of data transmission in the conventional technology. Reference is made to FIG. 8, which is a schematic diagram illustrating efficiency of data transmission according to an embodiment of the present disclosure. In a case of a single user, it is assumed that the data channel is 320 MHz. Compared with the conventional technology, overhead in the present disclosure is slightly increased; and in a case of multiple users, efficiency of MAC layer in the present disclosure is greatly improved. In the present disclosure, the data channel is 300 MHz, and the ACK channel is 20 MHz. In a case of a single user, the time for transmitting is increased by 8 μs. In a case of multi-user transmission in which there are two users, the time needed in the conventional technology is increased to at least 552 μs; and if the acknowledge response frames are fed back by means of multi-user transmission in the present disclosure, the needed time is still 484 μs, which saves 12.3% of the time compared with the conventional technology, thereby increasing the efficiency of the MAC layer.

Figure 9:
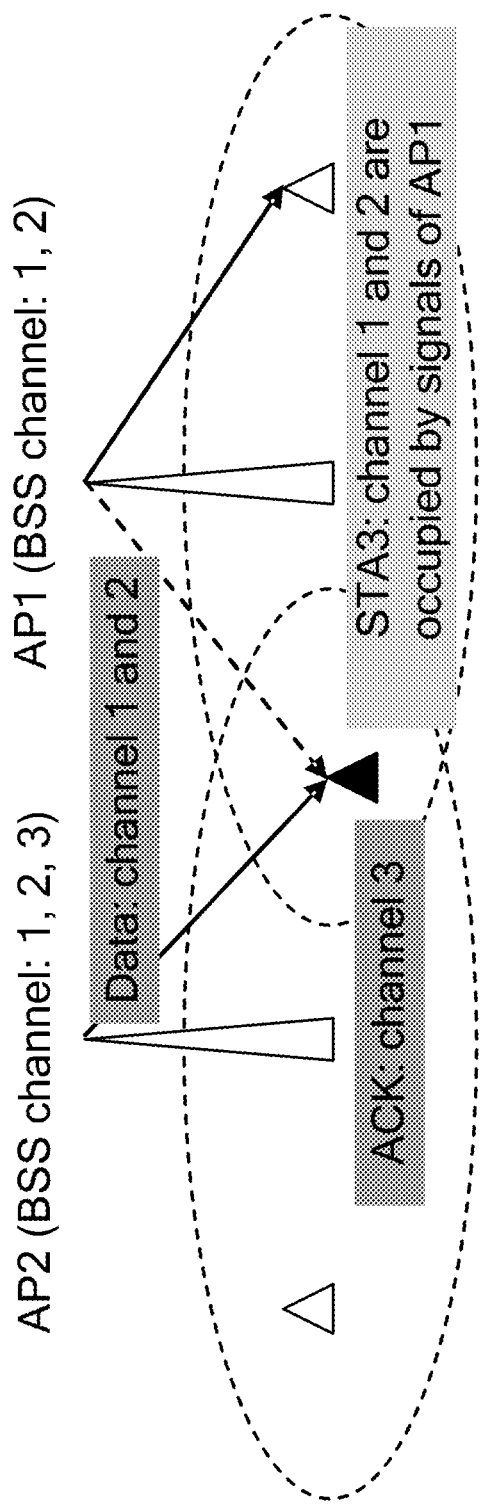
FIG. 9 is a schematic diagram illustrating efficiency of data transmission in the conventional technology.

Reference is made to FIG. 9, which is a schematic diagram illustrating efficiency of data transmission in the conventional technology. As shown in FIG. 9, in a case of an OBSS, there are at least two transmitter access point (AP) 1 and AP2, and there is a receiver STA3 in an area of the OBSS. The STA3 is associated with the AP2, that is, the AP1 sends no signal to the STA3. In another aspect, the STA3 has an ability to eliminate interference, with which an interference signal can be demodulated and be subtracted from a received signal, and then the signal received by the STA3 can be demodulated. In addition, channels of the AP1 are Channel1 and Channel2, and channels of the AP2 are Channel1, Channel2 and Channel3. The Channel1 and the Channel2 are occupied by the AP1, and all the channels of the AP2 are idle. On this premise, a data signal is sent by the AP2 on a data channel to the STA3. In a traditional mode of the conventional technology, the signal from the AP2 cannot be correctly demodulated by the STA3 because it is sensed by the STA3 that the Channel1 and the Channel2 are occupied, and even if the signal is correctly demodulated, no acknowledge response can be sent to the AP2. Base on the present disclosure, if the interference is eliminated and correct demodulation is performed, an acknowledgement ACK response frame can be returned by the STA3 on the Channel3 to the AP2, so that the Channel1, the Channel2 and the Channel3 can be effectively utilized to transmit data on the premise that the Channel1 and the Channel2 are utilized by the AP1.

A method for transmitting data is provided according to embodiments of the present disclosure. In accordance with the method, the first channel and the second channel are reserved, where the first channel is used to transmit the data and the second channel is used to transmit an ACK; the data is sent on the reserved first channel to the receiver; the ACK corresponding to the data sent by the receiver is received on the reserved second channel, and it is determined based on information carried in the ACK whether the data needs to be cached; and in a case that the information carried in the ACK indicates that the data is correctly received by the receiver, the data cached by the transmitter is cleared. By separately transmitting the data and the ACK, the problem that how to improve the efficiency of the MAC in the wireless system in a case of the limited cache capacity of the transmitter is solved.

Figure 10:
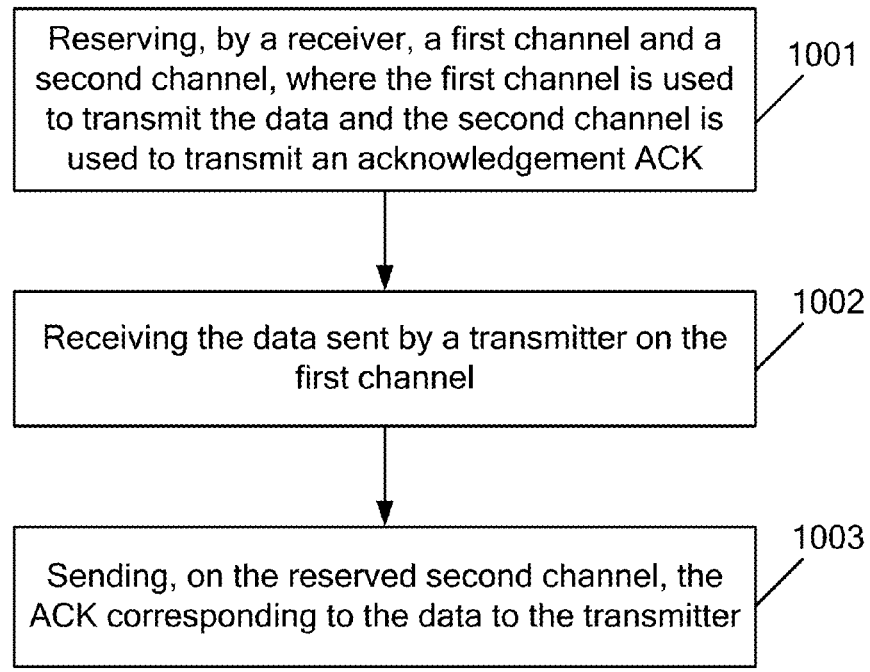
FIG. 10 is a flow chart of a method for providing communication efficiency according to an embodiment of the present disclosure.

Reference is made to FIG. 10, which is a flow chart of a method for improving communication efficiency according to an embodiment of the present disclosure. As shown in FIG. 10, the method includes the following steps.

In step 1001, a first channel and a second channel is reserved by a receiver, where the first channel is used to transmit the data and the second channel is used to transmit an acknowledgement ACK.

In a specific implementation, the first channel may be a single channel, or multiple continuous or discrete channels; in a specific implementation, the second channel may be a fixed channel of the BSS which is specialized for transmitting the ACK, a fixed channel of the BSS which is used to transmitting control frames or management frames (primary channel), or, a temporary channel which is determined to be usable based on a channel reservation frame before transmitting data. The channel is released immediately after use. In a case of an OBSS, the second channel may be used by multiple BSSs, so as to further reduce system efficiency.

Optionally, reserving by a receiver a first channel and a second channel includes:

receiving, by the receiver, on the first channel, a first channel reservation frame, sent by a transmitter, and receiving, by the receiver, on the second channel, a second channel reservation frame, sent by the transmitter, where the first channel reservation frame is used to reserve the first channel and carry time for reserving the first channel, and the second channel reservation frame is used to reserve the second channel and carry time for reserving the second channel; and sending, by the receiver, at least one of a response frame of the first channel reservation frame and a response frame of the second channel reservation frame, to the transmitter, so as to enable the transmitter to determine whether the first channel is successfully reserved based on the at least one of the response frame of the first channel reservation frame and the response frame of the second channel reservation frame sent by the receiver, and to enable the transmitter to determine whether the second channel is successfully reserved based on the at least one of the response frame of the first channel reservation frame and the response frame of the second channel reservation frame sent by the receiver.

Specifically, in a case that the response frame of the first channel reservation frame sent by the receiver is received by the transmitter on the first channel, the first channel is successfully reserved by the transmitter; in a case that the response frame of the second channel reservation frame sent by the receiver is received by the transmitter on the second channel, the second channel is successfully reserved by the transmitter. In a case that the response frame of the first channel reservation frame, sent by the receiver and received on the first channel by the transmitter, indicates that a response frame is also sent by the receiver on the second channel, the first channel and the second channel are successfully reserved by the transmitter; in a case that the response frame of the second channel reservation frame, sent by the receiver and received on the second channel by the transmitter, indicates that a response frame is also sent by the receiver on the first channel, the second channel and the first channel are successfully reserved by the transmitter.

Specifically, reference is made to FIG. 2, which is a schematic diagram of a method for reserving channels according to an embodiment of the present disclosure. As shown in FIG. 2, a STA1 is a transmitter, a STA2 is a receiver, a Channel1 is a first channel used to transmit data and a Channel2 is a second channel used to send the ACK.

The channel reservation frames RTSs are sent by the STA1 on the Channel1 and the Channel2 at the same time. The RTSs on the different channels may be the same or not. In a case that the first RTS is sent on the Channel1, the time for reserving the Channel1 is carried by the first RTS; and in a case that the second RTS is sent on the Channel2, the time for reserving the Channel2 is carried by the second RTS. In addition, identifiers of sub-channels on which other RTSs are sent at the same time are also carried by the RTS, so as to enable the receiver for the RTSs to obtain all the sub-channels sending the RTSs more reliably. In a case that the first channel and the second are successfully reserved, a CTS is sent by the STA2 on at least one of the Channel1 and the Channel2 to the STA1, the time for reserving the channels may be carried in the RTSs, the CTS, the Data or the ACK.

In a case that the response frames of the RTSs are sent by the STA2 on the Channel1 and the Channel2 at the same time, the Channel1 and the Channel2 are successfully reserved by the STA1; in a case that the STA2 responds on only one of the Channel1 and the Channel2, only one of the Channel1 and the Channel2 is successfully reserved; and in a case that the STA2 makes no response, no channel is successfully reserved by the STA1.

The method further includes:

carrying, by the transmitter, a maximum cache capacity, in at least one of the first channel reservation frame and the second channel reservation frame or in a capability field, where the maximum cache capacity is used by the receiver to determine latest time for sending the ACK corresponding to the data to the transmitter.

An interaction of the capacity field may be performed between the receiver STA and the transmitter STA before the data is sent.

In the conventional technology, in order to support reliable transmission of a data packet, a repeated transmission mechanism is needed. In a repeated transmission, before it is determined by the transmitter that signals are correctly received by the receiver for receiving the data, the data needs to be cached. Therefore, as a length of the data packet increases, the transmitter and the receiver need to have sufficiently large caches, so as to ensure that the data can be cached by the transmitter after the data is sent and before the acknowledgement (ACK) is correctly received. In practice, in consideration of a size of a chip, capacities of the caches are limited. Therefore, it is a problem to be solved that how to avoid the data being lost due to the limited caches.

As another possible implementation, on the basis of the conventional technology, the data and the maximum cache capacity, sent by the transmitter, are received by the receiver, the maximum cache capacity is used by the receiver to determine the latest time for sending the ACK corresponding to the data to the transmitter, and the ACK may be sent by the receiver to the transmitter before the latest time, thereby solving the problem in the conventional technology that the data is lost due to the limited caches.

In step 1002, the data sent by the transmitter on the first channel is received.

In step 1003, the ACK corresponding to the data is sent on the reserved second channel to the transmitter.

Optionally, receiving the data sent by a transmitter on the first channel includes:

receiving the data sent by the single transmitter on the first channel.

Specifically, reference is made to FIG. 2, in a case that the Channel1 and the Channel2 are successfully reserved by the STA1, then Data is sent by the STA1 on the Channel1 to the STA2.

Sending on the reserved second channel the ACK corresponding to the data to the transmitter includes:

calculating, by the receiver, the time for reaching the maximum cache capacity of the transmitter, based on a rate carried by the preamble at which the transmitter sends the data, or, receiving, by the receiver, the time for reaching the maximum cache capacity of the transmitter, sent by the transmitter.

Specifically, in a case that the maximum cache capacity carried by the transmitter is in a form of a cache capacity value, the time T for reaching the maximum cache capacity of the STA1 is calculated by the STA1, based on the rate carried by the preamble at which the STA1 sends the data to the STA2 and the maximum cache capacity of the STA1. That is, if the maximum cache capacity of the receiver is C bits and the rate carried by the preamble is R bit/second, the latest time is calculated by the receiver: T=C/R, based on the maximum cache capacity. In a case that the maximum cache capacity carried by the STA1 is in a form of the latest time that the transmitter sends the ACK corresponding to the data, the T sent by the STA1 is directly received by the STA2.

The ACK is sent by the receiver to the transmitter, after idle PIFS time of the second channel, after SIFS time of the preamble or after a response request frame corresponding to the data is sent by the transmitter, and before the time for reaching the maximum cache capacity of the transmitter; or, the ACK is sent by the receiver to the transmitter in a limited contention-free manner or by means of CSMA.

The limited contention-free manner refers to that a specified STA occupies the second channel, by means of carrier sense multiple access with collision avoidance (CSMA/CA) to perform sending, in a time period.

Specifically, the CSMA/CA is a channel contention method, it is sensed by the STA2 whether the second channel is idle, the STA2 waits for the idle time of the second channel to be a DIFS. When it is sensed by the STA2 that the second channel is not occupied, a time value which is a backofftime is randomly generated, and the ACK corresponding to the data is sent by the STA2 on the second channel to the STA1.

The ACK corresponding to the data is received by the transmitter on the second channel.

Optionally, receiving the data sent by a transmitter on the first channel includes:

sending by the transmitter on the reserved first channel the data to the multiple receivers by means of downlink multi-user transmission.

Specifically, reference is made to FIG. 3, which is a schematic diagram of a method for transmitting data according to an embodiment of the present disclosure. As shown in FIG. 3, it is assumed that Data (2) and Data(3) are sent by the STA1 to the STA2 and STA3 respectively at the same time by means of downlink multi-user transmission. The means of multi-user transmission may be downlink multi-user MIMO (LD MU-MIMO) or downlink orthogonal frequency division multiplexing access (OFDMA), which is not limited herein.

Sending on the reserved second channel the ACK corresponding to the data to the transmitter includes:

receiving by the multiple receivers the data on the first channel;

in a case that all the multiple receivers support uplink multi-user transmission, sending, by the transmitter, response request frames corresponding to the data on the reserved second channel, and after the response request frames are received by the multiple receivers, sending, by the multiple receivers, acknowledgements ACKs to the transmitter at the same time by means of uplink multi-user transmission before a minimum one of the times for reaching maximum cache capacities of the transmitter for the multiple receivers; or, Specifically, in a case that the maximum cache capacities carried by the transmitter are in a form of a cache capacity value, the times for reaching the maximum cache capacities of the transmitter corresponding to the multiple receivers are calculated by the multiple receiver, based on the rates carried by the preambles at which the transmitter sends the data to the multiple receivers respectively. Or, in a case that latest times for the multiple receivers to send respectively the ACKs corresponding to the data to the transmitter are sent by the transmitter to the multiple receivers, the latest times are respectively received by the multiple receivers.

Specifically, in a case that the maximum cache capacities are respectively specified for each user, based on a rate $R(2)$ at which the STA1 sends the Data(2) to the STA2 and a maximum capacity $C(2)$ of the cache of the STA1 for the STA2, the STA2 may calculate the time for reaching the maximum cache capacity of the STA1: $T2=C(2)/R(2)$, and based on a rate $R(3)$ at which the STA1 sends the Data(3) to the STA3 and a maximum capacity $C(3)$ of the cache of the STA1 for the STA3, the STA2 may calculate the time for reaching the maximum cache capacity of the STA1: $T3=C(3)/R(3)$. The T2 and the T3 are compared. In a case that the T2 is less than the T3, the response frames of the Data(2) and the Data(3) are sent by the STA2 and the STA3 on the second channel to the STA1 at the same time before T2; in a case that the T2 is greater than the T3, the response frames of the Data(2) and the Data(3) are sent by the STA2 and the STA3 on the second channel to the STA1 at the same time before T3. In a case that the maximum cache capacity C is specified for all users, based on the rate $R(2)$ at which the STA1 sends the Data(2) and the rate $R(3)$ at which the STA1 sends the Data(3), the STA2 and the STA3 may calculate the time for reaching the maximum cache capacity: $T=C/(R(2)+R(3))$.

In a case the multiple receivers do not support the uplink multi-user transmission, after the response request frames are received by the multiple receivers, the times for reaching the maximum cache capacities of the transmitter, corresponding to the multiple receivers, are calculated by the multiple receivers, based on the rates carried by the preamble at which the transmitter sends respectively the data to the multiple receivers, and before the times for reaching the maximum cache capacities of the transmitter corresponding to the multiple receivers, the acknowledgements ACKs are sent respectively by the multiple receivers to the transmitter; or, Specifically, in a case that the STA2 and the STA3 do not support the uplink multi-user transmission, then the T2 and the T3 are respectively calculated by the STA2 and the STA3, an ACK is sent by the STA2 to the STA1 before the T2, and an ACK is sent by the STA3 to the STA1 before T3.

The ACKs are sent by the multiple receivers on the second channel to the transmitter in a limited contention-free manner.

The limited contention-free manner refers to that a specified STA occupies the second channel, by means of carrier sense multiple access with collision avoidance (CSMA/CA)

to perform sending, in a time period. In the embodiment, the specified STA refers to multiple receivers in downlink multi-user transmission; and the time period refers to the length of time for reserving the second channel by the transmitter.

Specifically, the STA2 and the STA3 sense the second channel and generate a first random number A and a second random number B respectively. The first ransom number A is successively decreased in a case that it is sensed by the STA2 that the second channel is not occupied, and the ransom number B is successively decreased in a case that it is sensed by the STA3 that the second channel is not occupied. An acknowledgement ACK is sent by the STA2 to the STA1 when the first ransom number A is decreased to 0, and an acknowledgement ACK is sent by the STA3 to the STA1 when the second ransom number B is decreased to 0.

The ACKs corresponding to the data, sent by the receivers, are received by the transmitter on the second channel.

Optionally, receiving the data sent by a transmitter on the first channel includes:

sending by multiple transmitters on the first channel the data to the receiver by means of uplink multi-user transmission.

Specifically, reference is made to FIG. 4, which is a schematic diagram of a method for transmitting data according to an embodiment of the present disclosure. In FIG. 4, the STA2 and the STA3 are transmitters, and the STA1 is a receiver. The Data(2) is sent by the STA2 to the STA1, and the Data(3) is sent by the STA3 to the STA1.

Sending on the reserved second channel the ACK corresponding to the data to the transmitter includes:

Latest times for reaching maximum cache capacities of the multiple transmitters, corresponding to the multiple transmitters, are respectively calculated by the receiver, based on rates carried by preambles at which the multiple transmitters send the data to the receiver, and before a minimum one of the times for reaching the maximum cache capacities of the multiple transmitters, acknowledgements ACKs are sent by the receiver to the multiple transmitters at the same time by means of downlink multi-user transmission; or, the latest times corresponding to the multiple transmitters are sent respectively by the multiple transmitters to the receiver, and the latest times are received by the receiver; or, Specifically, based on a rate R(2) at which the STA2 sends the data and the maximum cache capacity of the STA2, the STA1 may calculate C(2) the time for reaching the maximum cache capacity of the STA2: T2=C(2)/R(2), and based on a rate R(3) at which the STA3 sends the data and the maximum cache capacity C(3) of the STA3, the STA1 may calculate the time for reaching the maximum cache capacity of the STA3: T3=C(3)/R(3). The T2 and the T3 are compared by the STA1, in a case that the T2 is less than the T3, the ACKs are sent by the STA1 to the STA2 and the STA3 before the T2, and in a case that the T3 is less than the T2, the ACKs are sent by the STA1 to the STA2 and the STA3 before the T3.

The times for reaching the maximum cache capacities of the multiple transmitters, corresponding to the multiple transmitters, are calculated respectively by the receiver, based on the rates carried by the preambles at which the multiple transmitters send the data to the receiver, and before the times for reaching the maximum cache capacities of the multiple transmitters, the acknowledges ACKs are sent respectively by the receiver to the multiple transmitters.

Specifically, the time T2 for reaching the maximum cache capacity of the STA2 is calculated by the STA1 based on the rate at which the STA2 sends the data and the maximum cache capacity of the STA2, the time T3 for reaching the maximum cache capacity of the STA3 is calculated by the STA1 based on the rate at which the STA3 sends the data and the maximum cache capacity of the STA3. An ACK is sent by the STA1 to the STA2 before the T2, and an ACK is sent by the STA1 to the STA3 before the T3.

The ACKs are sent by the receiver on the second channel to the transmitters in a limited contention-free manner or by means of CSMA.

There may be other devices using the second channel in a practical application scenario. Although there is only one receiver using the second channel to send the ACKs to the transmitters in this embodiment, the ACKs are sent by the receiver to the transmitters in a limited contention-free manner, so as to avoid that the second channel is used by the receiver and other devices together.

The ACKs corresponding to the data, sent by the receiver, are received by the multiple transmitters on the second channel.

Optionally, receiving the data sent by a transmitter on the first channel includes:

sending by multiple transmitters on the first channel the data to multiple receivers by means of cooperative transmission.

The cooperative transmission may be joint transmission in which all data information and channel information are shared, coordinated transmission in which channel information is shared and data information is not shared, or interference alignment, which is not limited herein.

Specifically, reference is made to FIG. 5, which is schematic diagram of a method for transmitting data according to an embodiment of the present disclosure. The Data(1) is sent by the STA1 to the STA3, and the Data(2) is sent by the STA2 to the STA4.

Sending on the reserved second channel the ACK corresponding to the data to the transmitter includes:

sending respectively by multiple transmitters response request frames corresponding to the data on the reserved second channel by means of Poll, and after the response request frames are received by multiple receivers and after SIFS, ACKs are sent by the multiple receivers to the multiple transmitters; or, Specifically, the response request frame corresponding to the Data(1) is sent by the STA1 on the second channel to the STA3, and the response request frame corresponding to the Data(2) is sent by the STA2 on the second channel to the STA4. An ACK is sent by the STA3 to the STA1, after the response request frame corresponding to the Data(1) is received and after SIFS; and an ACK is sent by the STA4 to the STA2, after the response request frame corresponding to the Data(2) is received and after SIFS.

The sequence of poll for sending is determined by the multiple transmitters based on interaction of maximum cache capacity information among them.

The receivers are requested by the multiple transmitters respectively on the second channel to send the ACKs, in a limited contention-free manner; or, Specifically, the STA1 and the STA2 sense the second channel and generate a first random number A and a second random number B respectively, the first ransom number A is successively decreased in a case that it is sensed by the STA1 that the second channel is not occupied, and the ransom number B is successively decreased in a case that it is sensed by the STA2 that the second channel is not occupied. A response request frame is sent by the STA1 to the STA3 when the first ransom number A is decreased to 0, and a response request frame is sent by the STA2 to the STA4 when the second ransom number B is decreased to 0.

The ACKs are sent by the multiple receivers to the transmitters in a limited contention-free manner.

The limited contention-free manner refers to that a specified STA occupies the second channel by means of CSMA/CA to perform sending, in a time period. In the embodiment, the specified STA refers to multiple receivers in coordinated transmission; and the time period refers to the length of time for reserving the second channel by the transmitters.

Specifically, the STA3 and the STA4 sense the second channel and generate a first random number A and a second random number B respectively, the first ransom number A is successively decreased in a case that it is sensed by the STA3 that the second channel is not occupied, and the ransom number B is successively decreased in a case that it is sensed by the STA4 that the second channel is not occupied. An acknowledgement ACK is sent by the STA3 to the STA1 when the first ransom number A is decreased to 0, and an acknowledgement ACK is sent by the STA4 to the STA2 when the second ransom number B is decreased to 0.

The ACKs corresponding to the data, sent by the multiple receivers, are received by the multiple transmitters on the second channel.

Specifically, in a case that the ACKs corresponding to the data sent by the receivers are received by the transmitters, then it is determined whether the data in the caches of the transmitters need to be cleared, based on contents of the ACKs. In a case that the contents of the ACKs indicate that the data is correctly received by the receivers, the correctly received data is cleared by the transmitters; and in a case that the contents of the ACKs indicate that the data is not correctly received by the receivers, the data is re-transmitted by the transmitters.

The receivers have sent the data on the first channel, and then continue to request or wait for the ACKs on the second channel, until all the data acknowledge frames are received or the times for reserving the channels are over; and the transmitters send the data acknowledge frames on the second channel, until all the data acknowledge frames are sent or the times for reserving are over.

As an optional embodiment, the method further includes:

carrying, by the transmitter, starting time for channel reservation, in at least one of the first channel reservation frame and the second channel reservation frame, in the data or in the preamble.

Specifically, reference is made to FIG. 6, which is a schematic diagram of a method for transmitting data according to an embodiment of the present disclosure. As shown in FIG. 6, the transmitter STA1 makes the MAC Header to carry information of the time for the STA1 to start to reserve a channel, on which the MAC Header is located, and information of the length of the time for the reserving, and a response frame of the data sent by the receiver STA is received by the STA1 on the cannel during the time; an ACK is sent by the receiver STA2 on the second channel based on the time for starting to reserve the channel; and before the time for starting to reserve the channel, the second channel may be used by other STAs to transmit data. Since the channel is reserved by the STA1 after the time for starting to reserve the channel, NAVs are set to nonzero values for other STAs except the transmitter STA and the receiver STA, and the other STAs cannot transmit data on the channel during the time period indicated by the values of the NAVs . The information of the time for the transmitter STA to start to reserve the channel, on which the MAC Header is located, and the information of the length of the time for the reserving, may also be carried in the channel reservation frame sent by the transmitter STA or in the preamble.

As an optional embodiment, the method further includes:

sending, by the transmitter, an instruction for returning to a preset operating mode, to the receiver, in a case that at least one of the first channel and the second channel is not successfully reserved by the transmitter.

Specifically, in a case that the second channel is not successfully reserved when the transmitter reserves the channel or starts to transmit the data, for example, no response of the channel reservation frame is obtained in a fixed time after the channel reservation frame is sent on the second channel, then transmitter needs to instruct the receiver to return to an initial operating mode.

A method for instructing the receiver to return to the initial operating mode may include: indicating that the second channel will no longer be used in the subsequent data transmission.

The initial operating mode refers to that a response of the receiver to the data is received by the transmitter on the first channel after SIFS for sending the data on the first channel.

Reference is made to FIG. 9, which is a schematic diagram of efficiency illustrating data transmission in the conventional technology. As shown in FIG. 9, in a case of an OBSS, there are at least two transmitter AP1 and AP2, and there is a receiver STA3 in an area of the OBSS. The STA3 is associated with the AP2, that is, the AP1 sends no signal to the STA3. In another aspect, the STA3 has an ability to eliminate interference, with which an interference signal can be demodulated and be subtracted from a received signal, and then the signal received by the STA3 can be demodulated. In addition, channels of the AP1 are Channel1 and Channel2, and channels of the AP2 are Channel1, Channel2 and Channel3. The Channel1 and the Channel2 are occupied by the AP1, and all the channels of the AP2 are idle. On this premise, a data signal is sent by the AP2 on a data channel to the STA3. In a traditional mode of the conventional technology, the signal from the AP2 cannot be correctly demodulated by the STA3 because it is sensed by the STA3 that the Channel1 and the Channel2 are occupied, and even if the signal is correctly demodulated, no acknowledge response can be sent to the AP2. Base on the present disclosure, if the interference is eliminated and correct demodulation is performed, an acknowledgement ACK response frame can be returned by the STA3 on the Channel3 to the AP2, so that the Channel1, the Channel2 and the Channel3 can be effectively utilized to transmit data on the premise that the Channel1 and the Channel2 are utilized by the AP1.

A method for transmitting data is provided according to embodiments of the present disclosure. In accordance with the method, the first channel and the second channel are reserved, where the first channel is used to transmit the data and the second channel is used to transmit an ACK; data is sent on the reserved first channel to the receiver; the ACK corresponding to the data sent by the receiver is received on the reserved second channel, and it is determined based on information carried in the ACK whether the data needs to be cached; and in a case that the information carried in the ACK indicates that the data is correctly received by the receiver, the data cached by the transmitter is cleared. By separately transmitting the data and the ACK, the problem that how to improve the efficiency of the MAC in the wireless system in a case of the limited cache capacity of the transmitter is solved.

Figure 11:
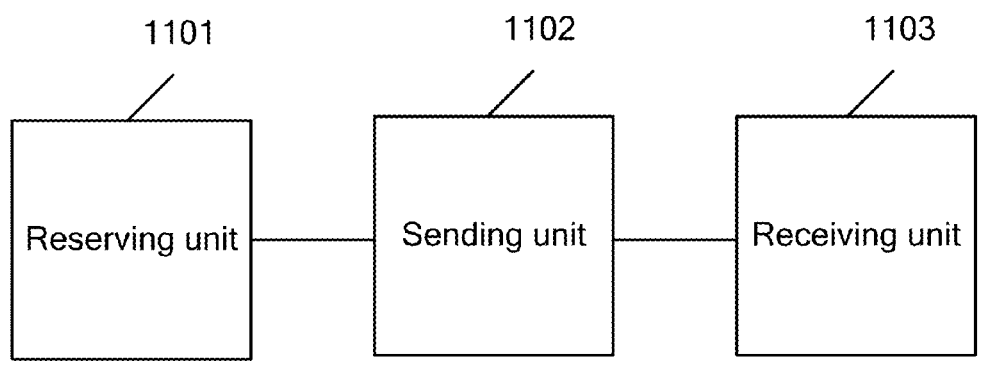
FIG. 11 is a structural diagram of a transmitter according to an embodiment of the present disclosure.

Reference is made to FIG. 11, which is a structural diagram of a transmitter according to an embodiment of the present disclosure. As shown in FIG. 11, the transmitter includes:

a reserving unit 1101, configured to reserve a first channel and a second channel, where the first channel is used to transmit the data and the second channel is used to transmit an acknowledgement ACK.

In a specific implementation, the first channel may be a single channel, or multiple continuous or discrete channels; in a specific implementation, the second channel may be a fixed channel of the BSS which is specialized for transmitting the ACK, a fixed channel of the BSS which is used to transmitting control frames or management frames (primary channel), or, a temporary channel which is determined to be usable based on a channel reservation frame before transmitting data. The channel is released immediately after use. In a case of an OBSS, the second channel may be used by multiple BSSs, so as to further reduce system efficiency.

Optionally, the reserving unit 1101 is configured to:

send on the first channel a first channel reservation frame to a receiver, and send on the second channel a second channel reservation frame to the receiver, where the first channel reservation frame is used to reserve the first channel and carry time for reserving the first channel, and the second channel reservation frame is used to reserve the second channel and carry time for reserving the second channel; and determine, whether the first channel is successfully reserved, based on at least one of a response frame of the first channel reservation frame and a response frame of the second channel reservation frame, sent by the receiver, and determine, by the transmitter whether the second channel is successfully reserved, based on at least one of the response frame of the first channel reservation frame and the response frame of the second channel reservation frame, sent by the receiver.

Specifically, in a case that the response frame of the first channel reservation frame sent by the receiver is received by the transmitter on the first channel, the first channel is successfully reserved by the transmitter; in a case that the response frame of the second channel reservation frame sent by the receiver is received by the transmitter on the second channel, the second channel is successfully reserved by the transmitter. In a case that the response frame of the first channel reservation frame, sent by the receiver and received on the first channel by the transmitter, indicates that a response frame is also sent by the receiver on the second channel, the first channel and the second channel are successfully reserved by the transmitter; in a case that the response frame of the second channel reservation frame, sent by the receiver and received on the second channel by the transmitter, indicates that a response frame is also sent by the receiver on the first channel, the second channel and the first channel are successfully reserved by the transmitter.

Specifically, reference is made to FIG. 2, which is a schematic diagram of a method for reserving channels according to an embodiment of the present disclosure. As shown in FIG. 2, a STA1 is a transmitter, a STA2 is a receiver, a Channel1 is a first channel used to transmit the data and a Channel2 is a second channel used to send the ACK.

The channel reservation frames RTSs are sent by the STA1 on the Channel1 and the Channel2 at the same time. The RTSs on the different channels may be the same or not. In a case that the first RTS is sent on the Channel1, the time for reserving the Channel1 is carried by the first RTS; and in a case that the second RTS is sent on the Channel2, the time for reserving the Channel2 is carried by the second RTS. In addition, identifiers of sub-channels on which other RTSs are sent at the same time are also carried by the RTS, so as to enable the receiver for the RTSs to obtain all the sub-channels sending the RTSs more reliably. In a case that the first channel and the second are successfully reserved, a CTS is sent by the STA2 on at least one of the Channel1 and the Channel2 to the STA1, the time for reserving the channels may be carried in the RTSs, the CTS, the Data or the ACK.

In a case that the response frames of the RTSs are sent by the STA2 on the Channel1 and the Channel2 at the same time, the Channel1 and the Channel2 are successfully reserved by the STA1; in a case that the STA2 responds on only one of the Channel1 and the Channel2, only one of the Channel1 and the Channel2 is successfully reserved; and in a case that the STA2 makes no response, no channel is successfully reserved by the STA1.

Optionally, the transmitter further includes a carrying unit, which is configured to:

carry a maximum cache capacity in at least one of the first channel reservation frame and the second channel reservation frame, in a preamble or in a capability field, where the maximum cache capacity is used by the receiver to determine latest time for sending the ACK corresponding to the data to the transmitter.

An interaction of the capacity field may be performed between the receiver STA and the transmitter STA before the data is sent.

A sending unit 1102 is configured to send on the reserved first channel the data to the receiver.

A receiving unit 1103 is configured to receive on the reserved second channel the ACK corresponding to the data sent by the receiver.

Optionally, the sending unit 1102 is configured to:

send, by the transmitter, on the reserved first channel the data to the receiver.

The receiving unit 1103 is configured to:

calculate the time for reaching the maximum cache capacity of the transmitter, based on a rate carried by the preamble at which the transmitter sends the data, or, receive, by the receiver, the time for reaching the maximum cache capacity of the transmitter sent by the transmitter;

send the ACK to the transmitter, after idle PIFS time of the second channel, after SIFS time of the preamble or after a response request frame corresponding to the data is sent by the transmitter, and before the time for reaching the maximum cache capacity of the transmitter; or, the ACK is sent by the receiver to the transmitter in a limited contention-free manner or by means of CSMA; and receive on the second channel the ACK corresponding to the data.

Specifically, reference is made to FIG. 2, in a case that the Channel1 and the Channel2 are successfully reserved by the STA1, then Data is sent by the STA1 on the Channel1 to the STA2.

In a case that the maximum cache capacity carried by the transmitter is in a form of a cache capacity value, the time T for reaching the maximum cache capacity of the STA1 is calculated by the STA1, based on the rate carried by the preamble at which the STA1 sends the data to the STA2 and the maximum cache capacity of the STA1. That is, if the maximum cache capacity of the receiver is C bits and the rate carried by the preamble is R bit/second, the latest time is calculated by the receiver: $T=C/R$, based on the maximum cache capacity. In a case that the maximum cache capacity carried by the STA1 is in a form of the latest time by which the transmitter sends the ACK corresponding to the data, the T sent by the STA1 is directly received by the STA2.

The CSMA/CA is a channel contention method, it is sensed by the STA2 whether the second channel is idle, the STA2 waits for the idle time of the second channel to be a DIFS. When it is sensed by the STA2 that the second channel is not occupied, a time value which is a backoff time is randomly generated, and the ACK corresponding to the data is sent by the STA2 on the second channel to the STA1.

Optionally, the sending unit 1102 is configured to:

send, on the reserved first channel, the data to the multiple receivers, by means of downlink multi-user transmission.

The receiving unit 1103 is configured to:

receive the data on the first channel.

in a case that all the multiple receivers support uplink multi-user transmission, send, by the transmitter, response request frames corresponding to the data on the reserved second channel, and after the response request frames are received by the multiple receivers, send, by the multiple receivers, acknowledgements ACKs to the transmitter at the same time by means of uplink multi-user transmission before a minimum one of the times for reaching maximum cache capacities of the transmitter for the multiple receivers; or, in a case that the multiple receivers do not support the uplink multi-user transmission, after the response request frames are received by the multiple receivers, calculate, by the multiple receivers, the times for reaching the maximum cache capacities of the transmitter corresponding to the multiple receivers, based on rates carried by the preamble at which the transmitter sends respectively the data to the multiple receivers, and before the times for reaching the maximum cache capacities of the transmitter corresponding to the multiple receivers, send respectively, by the multiple receivers, the acknowledgements ACKs to the transmitter; or, send respectively, by the multiple receivers, the ACKs on the second channel to the transmitter in a limited contention-free manner; and receive, on the second channel, the ACKs corresponding to the data, sent by the receivers.

Specifically, reference is made to FIG. 3, which is a schematic diagram of a method for transmitting data according to an embodiment of the present disclosure. As shown in FIG. 3, it is assumed that Data(2) and Data(3) are sent by the STA1 to the STA2 and STA3 respectively at the same time by means of downlink multi-user transmission. The means of multi-user transmission may be downlink multi-user MIMO (DL MU-MIMO) or downlink orthogonal frequency division multiplexing access (OFDMA), which is not limited herein.

In a case that the maximum cache capacities carried by the transmitter are in a form of a cache capacity value, the times for reaching the maximum cache capacities of the transmitter corresponding to the multiple receivers are calculated by the multiple receiver, based on the rates carried by the preambles at which the transmitter sends the data to the multiple receivers respectively. Or, in a case that latest times for the multiple receivers to send respectively the ACKs corresponding to the data to the transmitter are sent by the transmitter to the multiple receivers, the latest times are respectively received by the multiple receivers.

In a case that the maximum cache capacities are respectively specified for each user, based on a rate $R(2)$ at which the STA1 sends the Data(2) to the STA2 and a maximum capacity $C(2)$ of the cache of the STA1 for the STA2, the STA2 may calculate the time for reaching the maximum cache capacity of the STA1: $T2=C(2)/R(2)$, and based on a rate $R(3)$ at which the STA1 sends the Data(3) to the STA3 and a maximum capacity $C(3)$ of the cache of the STA1 for the STA3, the STA2 may calculate the time for reaching the maximum cache capacity of the STA1: $T3=C(3)/R(3)$. The T2 and the T3 are compared. In a case that the T2 is less than the T3, the response frames of the Data(2) and the Data(3) are sent by the STA2 and the STA3 on the second channel to the STA1 at the same time before T2; in a case that the T2 is greater than the T3, the response frames of the Data(2) and the Data(3) are sent by the STA2 and the STA3 on the second channel to the STA1 at the same time before T3. In a case that the maximum cache capacity C is specified for all users, based on the rate $R(2)$ at which the STA1 sends the Data(2) and the rate $R(3)$ at which the STA1 sends the Data(3), the STA2 and the STA3 may calculate the time for reaching the maximum cache capacity: $T=C/(R(2)+R(3))$.

In a case that the STA2 and the STA3 do not support the uplink multi-user transmission, then the T2 and the T3 are respectively calculated by the STA2 and the STA3, an ACK is sent by the STA2 to the STA1 before the T2, and an ACK is sent by the STA3 to the STA1 before T3.

The STA2 and the STA3 sense the second channel and generate a first random number A and a second random number B respectively. The first ransom number A is successively decreased in a case that it is sensed by the STA2 that the second channel is not occupied, and the ransom number B is successively decreased in a case that it is sensed by the STA3 that the second channel is not occupied. An acknowledgement ACK is sent by the STA2 to the STA1 when the first ransom number A is decreased to 0, and an acknowledgement ACK is sent by the STA3 to the STA1 when the second ransom number B is decreased to 0.

Optionally, the sending units 1102 are configured to:

send, on the first channel, the data to the same receiver by means of uplink multi-user transmission.

The receiving units 1103 are configured to:

calculate respectively latest times for reaching maximum cache capacities of the multiple transmitters, corresponding to the multiple transmitters, based on rates carried by preambles at which the multiple transmitters send the data to the receiver, and before a minimum one of the times for reaching the maximum cache capacities of the multiple transmitters, send acknowledgements ACKs to the multiple transmitters at the same time by means of downlink multi-user transmission; or, send respectively by the multiple transmitters the latest times corresponding to the multiple transmitters to the receiver, receive by the receiver the latest times; or, calculate respectively by the receiver the times for reaching the maximum cache capacities of the multiple transmitters, corresponding to the multiple transmitters, based on the rates carried by the preambles at which the multiple transmitters send the data to the receiver, and before the times for reaching the maximum cache capacities of the multiple transmitters, send respectively by the receiver the acknowledges ACKs to the multiple transmitters;

send the ACKs on the second channel to the transmitters in a limited contention-free manner or by means of CSMA; and receive, on the second channel, the ACKs corresponding to the data, sent by the receiver.

Specifically, reference is made to FIG. 4, which is a schematic diagram of a method for transmitting data according to an embodiment of the present disclosure. In FIG. 4, the STA2 and the STA3 are transmitters, and the STA1 is a receiver. The Data(2) is sent by the STA2 to the STA1, and the Data(3) is sent by the STA3 to the STA1.

Based on a rate $R(2)$ at which the STA2 sends the data and the maximum cache capacity of the STA2, the STA1 may calculate C(2) the time for reaching the maximum cache capacity of the STA2: T2=C(2)/R(2), and based on a rate R(3) at which the STA3 sends the data and the maximum cache capacity C(3) of the STA3, the STA1 may calculate the time for reaching the maximum cache capacity of the STA3: T3=C(3)/R(3). The T2 and the T3 are compared by the STA1, in a case that the T2 is less than the T3, the ACKs are sent by the STA1 to the STA2 and the STA3 before the T2, and in a case that the T3 is less than the T2, the ACKs are sent by the STA1 to the STA2 and the STA3 before the T3.

The time T2 for reaching the maximum cache capacity of the STA2 is calculated by the STA1 based on the rate at which the STA2 sends the data and the maximum cache capacity of the STA2, the time T3 for reaching the maximum cache capacity of the STA3 is calculated by the STA1 based on the rate at which the STA3 sends the data and the maximum cache capacity of the STA3. An ACK is sent by the STA1 to the STA2 before the T2, and an ACK is sent by the STA1 to the STA3 before the T3.

The ACKs are sent by the receiver on the second channel to the transmitters in a limited contention-free manner or by means of CSMA.

There may be other devices using the second channel in a practical application scenario. Although there is only one receiver using the second channel to send the ACKs to the transmitters in this embodiment, the ACKs are sent by the receiver to the transmitters in a limited contention-free manner, so as to avoid that the second channel is used by the receiver and other devices together.

Optionally, the sending units 1102 are configured to:

send, on the first channel, the data to multiple receivers by means of cooperative transmission.

The receiving units 1103 are configured to:

send respectively, on the reserved second channel, response request frames corresponding to the data by means of Poll, and after the response request frames are received by the plurality of receivers and after SIFS, send by the plurality of receivers ACKs to the multiple transmitters; or, request the receivers to send the ACKs by the multiple transmitters respectively on the second channel in a limited contention-free manner; or, send respectively by the plurality of receivers the ACKs to the multiple transmitters in a limited contention-free manner; and receive, on the second channel, the ACKs corresponding to the data sent by the multiple receivers.

The cooperative transmission may be joint transmission in which all data information and channel information are shared, coordinated transmission in which channel information is shared and data information is not shared, or interference alignment, which is not limited herein.

Specifically, reference is made to FIG. 5, which is schematic diagram of a method for transmitting data according to an embodiment of the present disclosure. The Data(1) is sent by the STA1 to the STA3, and the Data(2) is sent by the STA2 to the STA4.

The response request frame corresponding to the Data(1) is sent by the STA1 on the second channel to the STA3, and the response request frame corresponding to the Data(2) is sent by the STA2 on the second channel to the STA4. An ACK is sent by the STA3 to the STA1, after the response request frame corresponding to the Data(1) is received and after SIFS; and an ACK is sent by the STA4 to the STA2, after the response request frame corresponding to the Data (2) is received and after SIFS.

The STA1 and the STA2 sense the second channel and generate a first random number A and a second random number B respectively, the first ransom number A is successively decreased in a case that it is sensed by the STA1 that the second channel is not occupied, and the ransom number B is successively decreased in a case that it is sensed by the STA2 that the second channel is not occupied. A response request frame is sent by the STA1 to the STA3 when the first ransom number A is decreased to 0, and a response request frame is sent by the STA2 to the STA4 when the second ransom number B is decreased to 0.

The limited contention-free manner refers to that a specified STA occupies the second channel, by means of CSMA/CA to perform sending, in a time period. In the embodiment, the specified STA refers to multiple receivers in coordinated transmission; and the time period refers to the length of time for reserving the second channel by the transmitters.

The STA3 and the STA4 sense the second channel and generate a first random number A and a second random number B respectively, the first ransom number A is successively decreased in a case that it is sensed by the STA3 that the second channel is not occupied, and the ransom number B is successively decreased in a case that it is sensed by the STA4 that the second channel is not occupied. An acknowledgement ACK is sent by the STA3 to the STA1 when the first ransom number A is decreased to 0, and an acknowledgement ACK is sent by the STA4 to the STA2 when the second ransom number B is decreased to 0.

In a case that the ACKs corresponding to the data sent by the receivers are received by the transmitters, then it is determined whether the data in the caches of the transmitters need to be cleared, based on contents of the ACKs. In a case that the contents of the ACKs indicate that the data is correctly received by the receivers, the correctly received data is cleared by the transmitters; and in a case that the contents of the ACKs indicate that the data is not correctly received by the receivers, the data is re-transmitted by the transmitters.

The receivers have sent the data on the first channel, and then continue to request or wait for the ACKs on the second channel, until all the data acknowledge frames are received or the times for reserving the channels are over; and the transmitters send the data acknowledge frames on the second channel, until all the data acknowledge frames are sent or the times for reserving are over.

Optionally, the carrying unit is further configured to:

carry, by the transmitter, starting time for channel reservation in at least one of the first channel reservation frame and the second channel reservation frame, in the data or in the preamble.

Specifically, reference is made to FIG. 6, which is a schematic diagram of a method for transmitting data according to an embodiment of the present disclosure. As shown in FIG. 6, the transmitter STA1 makes the MAC Header to carry information of the time for the STA1 to start to reserve a channel, on which the MAC Header is located, and information of the length of the time for the reserving, and a response frame of the data sent by the receiver STA is received by the STA1 on the channel during the time; an ACK is sent by the receiver STA2 on the second channel based on the time for starting to reserve the channel; and before the time for starting to reserve the channel, the second channel may be used by other STAs to transmit data. Since the channel is reserved by the STA1 after the time for starting to reserve the channel, network allocation vectors (NAV) are set to nonzero values for other STAs except the transmitter STA and the receiver STA, and the other STAs cannot transmit data on the channel during the time period indicated by the values of the NAVs.

The information of the time for the transmitter STA to start to reserve the channel, on which the MAC Header is located, and the information of the length of the time for the reserving, may also be carried in the channel reservation frame sent by the transmitter STA or in the preamble.

Optionally, the sending unit 1102 is further configured to:

send by the transmitter an instruction for returning to a preset operating mode to the receiver, in a case that at least one of the first channel and the second channel is not successfully reserved by the transmitter.

Specifically, in a case that the second channel is not successfully reserved when the transmitter reserves the channel or starts to transmit the data, for example, no response of the channel reservation frame is obtained in a fixed time after the channel reservation frame is sent on the second channel, then transmitter needs to instruct the receiver to return to an initial operating mode.

A method for instructing the receiver to return to the initial operating mode may include: indicating that the second channel will no longer be used, in the subsequent data transmission.

The initial operating mode refers to that a response of the receiver to the data is received by the transmitter on the first channel after SIFS for sending the data on the first channel.

Reference is made to FIG. 9, which is a schematic diagram illustrating efficiency of data transmission in the conventional technology. As shown in FIG. 9, in a case of an OBSS, there are at least two transmitter AP1 and AP2, and there is a receiver STA3 in an area of the OBSS. The STA3 is associated with the AP2, that is, the AP1 sends no signal to the STA3. In another aspect, the STA3 has an ability to eliminate interference, with which an interference signal can be demodulated and be subtracted from a received signal, and then the signal received by the STA3 can be demodulated. In addition, channels of the AP1 are Channel1 and Channel2, and channels of the AP2 are Channel1, Channel2 and Channel3. The Channel1 and the Channel2 are occupied by the AP1, and all the channels of the AP2 are idle. On this premise, a data signal is sent by the AP2 on a data channel to the STA3. In a traditional mode of the conventional technology, the signal from the AP2 cannot be correctly demodulated by the STA3 because it is sensed by the STA3 that the Channel1 and the Channel2 are occupied, and even if the signal is correctly demodulated, no acknowledge response can be sent to the AP2. Base on the present disclosure, if the interference is eliminated and correct demodulation is performed, an acknowledgement ACK response frame can be returned by the STA3 on the Channel3 to the AP2, so that the Channel1, the Channel2 and the Channel3 can be effectively utilized on to transmit data the premise that the Channel1 and the Channel2 are utilized by the AP1.

A transmitter is provided according to embodiments of the present disclosure, through the transmitter, the first channel and the second channel are reserved, where the first channel is used to transmit the data and the second channel is used to transmit an ACK; the data is sent on the reserved first channel to the receiver; the ACK corresponding to the data sent by the receiver is received on the reserved second channel, and it is determined based on information carried in the ACK whether the data needs to be cached; and in a case that the information carried in the ACK indicates that the data is correctly received by the receiver, the data cached by the transmitter is cleared. By separately transmitting the data and the ACK, the problem that how to improve the efficiency of the MAC in the wireless system in a case of the limited cache capacity of the transmitter is solved.

Figure 12:
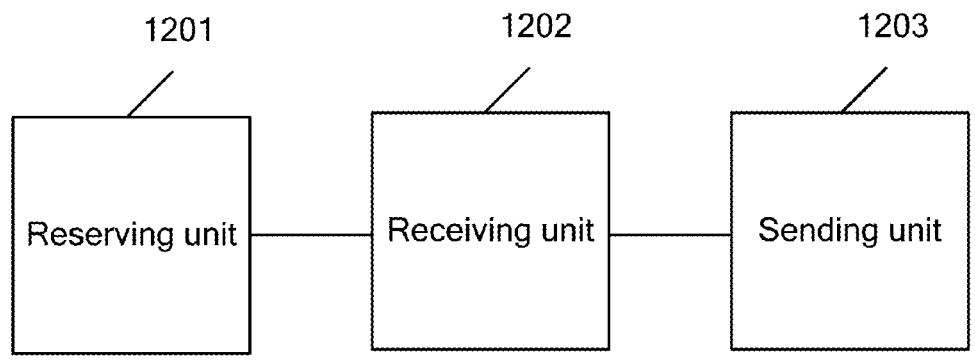
FIG. 12 is a structural diagram of a receiver according to an embodiment of the present disclosure.

Reference is made to FIG. 12, which is a structural diagram of a receiver according to an embodiment of the present disclosure. As shown in FIG. 12, the receiver includes:

a reserving unit 1201, configured to reserve a first channel and a second channel, where the first channel is used to transmit the data and the second channel is used to transmit an acknowledgement ACK.

In a specific implementation, the first channel may be a single channel, or multiple continuous or discrete channels; in a specific implementation, the second channel may be a fixed channel of the BSS which is specialized for transmitting the ACK, a fixed channel of the BSS which is used to transmitting control frames or management frames (primary channel), or, a temporary channel which is determined to be usable based on a channel reservation frame before transmitting data. The channel is released immediately after use. In a case of an OBSS, the second channel may be used by multiple BSSs, so as to further reduce system efficiency.

Optionally, the reserving unit 1201 is configured to:

receive on the first channel a first channel reservation frame sent by a transmitter, and receive on the second channel a second channel reservation frame sent by the transmitter, where the first channel reservation frame is used to reserve the first channel and carry time for reserving the first channel, and the second channel reservation frame is used to reserve the second channel and carry time for reserving the second channel; and send, at least one of a response frame of the first channel reservation frame and a response frame of the second channel reservation frame, to the transmitter, so as to enable the transmitter to determine whether the first channel is successfully reserved based on the at least one of the response frame of the first channel reservation frame and the response frame of the second channel reservation frame sent by a receiver, and to enable the transmitter to determine whether the second channel is successfully reserved based on the at least one of the response frame of the first channel reservation frame and the response frame of the second channel reservation frame sent by the receiver.

Specifically, in a case that the response frame of the first channel reservation frame sent by the receiver is received by the transmitter on the first channel, the first channel is successfully reserved by the transmitter; in a case that the response frame of the second channel reservation frame sent by the receiver is received by the transmitter on the second channel, the second channel is successfully reserved by the transmitter. In a case that the response frame of the first channel reservation frame, sent by the receiver and received on the first channel by the transmitter, indicates that a response frame is also sent by the receiver on the second channel, the first channel and the second channel are successfully reserved by the transmitter; in a case that the response frame of the second channel reservation frame, sent by the receiver and received on the second channel by the transmitter, indicates that a response frame is also sent by the receiver on the first channel, the second channel and the first channel are successfully reserved by the transmitter.

Specifically, reference is made to FIG. 2, which is a schematic diagram of a method for reserving channels according to an embodiment of the present disclosure. As shown in FIG. 2, a STA1 is a transmitter, a STA2 is a receiver, a Channel1 is a first channel used to transmit data and a Channel2 is a second channel used to send the ACK.

The channel reservation frames RTSs are sent by the STA1 on the Channel1 and the Channel2 at the same time. The RTSs on the different channels may be the same or not.

In a case that the first RTS is sent on the Channel1, the time for reserving the Channel1 is carried by the first RTS; and in a case that the second RTS is sent on the Channel2, the time for reserving the Channel2 is carried by the second RTS. In addition, identifiers of sub-channels on which other RTSs are sent at the same time are also carried by the RTS, so as to enable the receiver for the RTSs to obtain all the sub-channels sending the RTSs more reliably. In a case that the first channel and the second are successfully reserved, a CTS is sent by the STA2 on at least one of the Channel1 and the Channel2 to the STA1, the time for reserving the channels may be carried in the RTSs, the CTS, the Data or the ACK.

In a case that the response frames of the RTSs are sent by the STA2 on the Channel1 and the Channel2 at the same time, the Channel1 and the Channel2 are successfully reserved by the STA1; in a case that the STA2 responds on only one of the Channel1 and the Channel2, only one of the Channel1 and the Channel2 is successfully reserved; and in a case that the STA2 makes no response, no channel is successfully reserved by the STA1.

Optionally, the transmitter further includes a carrying unit, where the carrying unit is configured to:

carry a maximum cache capacity in at least one of the first channel reservation frame and the second channel reservation frame, in a preamble or in a capability field, where the maximum cache capacity is used by the receiver to determine latest time for sending the ACK corresponding to the data to the transmitter.

An interaction of the capacity field may be performed between the receiver STA and the transmitter STA before the data is sent.

A receiving unit 1202 is configured to receive the data, sent by the transmitter on the first channel.

A sending unit 1203 is configured to send on the second channel the ACK corresponding to the data to the transmitter.

Optionally, the sending unit 1203 is configured to:

calculate the time for reaching the maximum cache capacity of the transmitter, based on a rate carried by the preamble at which the transmitter sends the data, or, receive, by the receiver, the time for reaching the maximum cache capacity of the transmitter sent by the transmitter;

send the ACK is to the transmitter, after idle PIFS time of the second channel, after SIFS time of the preamble or after a response request frame corresponding to the data is sent by the transmitter, and before the time for reaching the maximum cache capacity of the transmitter; or, send by the receiver the ACK to the transmitter in a limited contention-free manner or by means of CSMA; and receive on the second channel the ACK corresponding to the data.

Specifically, reference is made to FIG. 2, in a case that the Channel1 and the Channel2 are successfully reserved by the STA1, then Data is sent by the STA1 on the Channel1 to the STA2.

In a case that the maximum cache capacity carried by the transmitter is in a form of a cache capacity value, the time T for reaching the maximum cache capacity of the STA1 is calculated by the STA1, based on the rate carried by the preamble at which the STA1 sends the data to the STA2 and the maximum cache capacity of the STA1. That is, if the maximum cache capacity of the receiver is C bits and the rate carried by the preamble is R bit/second, the latest time is calculated by the receiver: $T=C/R$, based on the maximum cache capacity. In a case that the maximum cache capacity carried by the STA1 is in a form of the latest time that the transmitter sends the ACK corresponding to the data, the T sent by the STA1 is directly received by the STA2.

The CSMA/CA is a channel contention method, it is sensed by the STA2 whether the second channel is idle, the STA2 waits for the idle time of the second channel to be a DIFS. When it is sensed by the STA2 that the second channel is not occupied, a time value which is a backoff time is randomly generated, and the ACK corresponding to the data is sent by the STA2 on the second channel to the STA1.

Optionally, the sending unit 1203 are configured to:

in a case that all the multiple receivers support uplink multi-user transmission, send response request frames corresponding to the data on the reserved second channel, and after the response request frames are received by the plurality of receivers, send acknowledgements ACKs to the transmitter at the same time by means of uplink multi-user transmission before a minimum one of the times for reaching maximum cache capacities of the transmitter for the multiple receivers; or, in a case that the multiple receivers do not support the uplink multi-user transmission, after the response request frames are received by the multiple receivers, calculate, by the plurality of receivers, the times for reaching the maximum cache capacities of the transmitter corresponding to the multiple receivers, based on rates carried by the preamble at which the transmitter sends respectively the data to the multiple receivers, and before the times for reaching the maximum cache capacities of the transmitter corresponding to the multiple receivers, sending respectively the acknowledgements ACKs to the transmitter; or, send respectively, on the second channel, the ACKs to the transmitter in a limited contention-free manner; and receive, on the second channel, the ACKs corresponding to the data, sent by the multiple receivers.

Specifically, reference is made to FIG. 3, which is a schematic diagram of a method for transmitting data according to an embodiment of the present disclosure. As shown in FIG. 3, it is assumed that Data(2) and Data(3) are sent by the STA1 to the STA2 and STA3 respectively at the same time by means of downlink multi-user transmission. The means of multi-user transmission may be downlink multi-user MIMO (LD MU-MIMO) or downlink orthogonal frequency division multiplexing access (OFDMA), which is not limited herein.

In a case that the maximum cache capacities carried by the transmitter are in a form of a cache capacity value, the times for reaching the maximum cache capacities of the transmitter corresponding to the multiple receivers are calculated by the multiple receiver, based on the rates carried by the preambles at which the transmitter sends the data to the multiple receivers respectively. Or, in a case that latest times for the multiple receivers to send respectively the ACKs corresponding to the data to the transmitter are sent by the transmitter to the multiple receivers, the latest times are respectively received by the multiple receivers;

In a case that the maximum cache capacities are respectively specified for each user, based on a rate R(2) at which the STA1 sends the Data(2) to the STA2 and a maximum capacity C(2) of the cache of the STA1 for the STA2, the STA2 may calculate the time for reaching the maximum cache capacity of the STA1: $T2=C(2)/R(2)$, and based on a rate R(3) at which the STA1 sends the Data(3) to the STA3 and a maximum capacity C(3) of the cache of the STA1 for the STA3, the STA2 may calculate the time for reaching the maximum cache capacity of the STA1: $T3=C(3)/R(3)$. The T2 and the T3 are compared. In a case that the T2 is less than the T3, the response frames of the Data(2) and the Data(3) are sent by the STA2 and the STA3 on the second channel to the STA1 at the same time before T2; in a case that the T2 is greater than the T3, the response frames of the Data(2) and the Data(3) are sent by the STA2 and the STA3 on the second channel to the STA1 at the same time before T3. In a case that the maximum cache capacity C is specified for all users, based on the rate R(2) at which the STA1 sends the Data(2) and the rate R(3) at which the STA1 sends the Data(3), the STA2 and the STA3 may calculate the time for reaching the maximum cache capacity: T=C/(R(2)+R(3)).

In a case that the STA2 and the STA3 do not support the uplink multi-user transmission, then the T2 and the T3 are respectively calculated by the STA2 and the STA3, an ACK is sent by the STA2 to the STA1 before the T2, and an ACK is sent by the STA3 to the STA1 before T3.

The STA2 and the STA3 sense the second channel and generate a first random number A and a second random number B respectively. The first ransom number A is successively decreased in a case that it is sensed by the STA2 that the second channel is not occupied, and the ransom number B is successively decreased in a case that it is sensed by the STA3 that the second channel is not occupied. An acknowledgement ACK is sent by the STA2 to the STA1 when the first ransom number A is decreased to 0, and an acknowledgement ACK is sent by the STA3 to the STA1 when the second ransom number B is decreased to 0.

Optionally, the sending unit 1203 is configured to:

calculate respectively latest times for reaching maximum cache capacities of the multiple transmitters, corresponding to the multiple transmitters, based on rates carried by preambles at which the multiple transmitters send the data to the receiver, and before a minimum one of the times for reaching the maximum cache capacities of the multiple transmitters, send acknowledgements ACKs to the multiple transmitters at the same time by means of downlink multi-user transmission; or, latest times corresponding to the multiple transmitters are sent respectively by the multiple transmitters to the receiver, the latest times are received by the receiver; or, calculate respectively, by the receiver, the times for reaching the maximum cache capacities of the multiple transmitters, corresponding to the multiple transmitters, based on the rates carried by the preambles at which the multiple transmitters send the data to the receiver, and before the times for reaching the maximum cache capacities of the multiple transmitters, send respectively by the receiver the acknowledges ACKs to the multiple transmitters;

send the ACKs are sent on the second channel to the transmitters in a limited contention-free manner or by means of CSMA; and receive, on the second channel, the ACKs corresponding to the data, sent by the receiver.

Specifically, reference is made to FIG. 4, which is a schematic diagram of a method for transmitting data according to an embodiment of the present disclosure. In FIG. 4, the STA2 and the STA3 are transmitters, and the STA1 is a receiver. The Data(2) is sent by the STA2 to the STA1, and the Data(3) is sent by the STA3 to the STA1.

Based on a rate R(2) at which the STA2 sends the data and the maximum cache capacity of the STA2, the STA1 may calculate C(2) the time for reaching the maximum cache capacity of the STA2: T2=C(2)/R(2), and based on a rate R(3) at which the STA3 sends the data and the maximum cache capacity C(3) of the STA3, the STA1 may calculate the time for reaching the maximum cache capacity of the STA3: T3=C(3)/R(3). The T2 and the T3 are compared by the STA1, in a case that the T2 is less than the T3, the ACKs are sent by the STA1 to the STA2 and the STA3 before the T2, and in a case that the T3 is less than the T2, the ACKs are sent by the STA1 to the STA2 and the STA3 before the T3.

The time T2 for reaching the maximum cache capacity of the STA2 is calculated by the STA1 based on the rate at which the STA2 sends the data and the maximum cache capacity of the STA2, the time T3 for reaching the maximum cache capacity of the STA3 is calculated by the STA1 based on the rate at which the STA3 sends the data and the maximum cache capacity of the STA3. An ACK is sent by the STA1 to the STA2 before the T2, and an ACK is sent by the STA1 to the STA3 before the T3.

The ACKs are sent by the receiver on the second channel to the transmitters in a limited contention-free manner or by means of CSMA;

There may be other devices using the second channel in a practical application scenario. Although there is only one receiver using the second channel to send the ACKs to the transmitters in this embodiment, the ACKs are sent by the receiver to the transmitters in a limited contention-free manner, so as to avoid that the second channel is used by the receiver and other devices together.

Optionally, the sending units 1203 are configured to:

send respectively response request frames corresponding to the data, on the reserved second channel, by means of Poll, and after the response request frames are received by the plurality of receivers and after SIFS, send, by the plurality of receivers, ACKs to the multiple transmitters; or, request the multiple receivers to send the ACKs, by the multiple transmitters respectively on the second channel in a limited contention-free manner; or, send respectively by the plurality of receivers the ACKs to the multiple transmitters in a limited contention-free manner; and receive, on the second channel, the ACKs corresponding to the data, sent by the multiple receivers.

The cooperative transmission may be joint transmission in which all data information and channel information are shared, coordinated transmission in which channel information is shared and data information is not shared, or interference alignment, which is not limited herein.

Specifically, reference is made to FIG. 5, which is schematic diagram of a method for transmitting data according to an embodiment of the present disclosure. The Data(1) is sent by the STA1 to the STA3, and the Data(2) is sent by the STA2 to the STA4.

The response request frame corresponding to the Data(1) is sent by the STA1 on the second channel to the STA3, and the response request frame corresponding to the Data(2) is sent by the STA2 on the second channel to the STA4. An ACK is sent by the STA3 to the STA1, after the response request frame corresponding to the Data(1) is received and after SIFS; and an ACK is sent by the STA4 to the STA2, after the response request frame corresponding to the Data (2) is received and after SIFS.

The STA1 and the STA2 sense the second channel and generate a first random number A and a second random number B respectively, the first ransom number A is successively decreased in a case that it is sensed by the STA1 that the second channel is not occupied, and the ransom number B is successively decreased in a case that it is sensed by the STA2 that the second channel is not occupied. A response request frame is sent by the STA1 to the STA3 when the first ransom number A is decreased to 0, and a response request frame is sent by the STA2 to the STA4 when the second ransom number B is decreased to 0.

The limited contention-free manner refers to that a specified STA occupies the second channel, by means of CSMA/

CA to perform sending, in a time period. In the embodiment, the specified STA refers to multiple receivers in coordinated transmission; and the time period refers to the length of time for reserving the second channel by the transmitters.

The STA3 and the STA4 sense the second channel and generate a first random number A and a second random number B respectively, the first ransom number A is successively decreased in a case that it is sensed by the STA3 that the second channel is not occupied, and the ransom number B is successively decreased in a case that it is sensed by the STA4 that the second channel is not occupied. An acknowledgement ACK is sent by the STA3 to the STA1 when the first ransom number A is decreased to 0, and an acknowledgement ACK is sent by the STA4 to the STA2 when the second ransom number B is decreased to 0.

In a case that the ACKs corresponding to the data sent by the receivers are received by the transmitters, then it is determined whether the data in the caches of the transmitters need to be cleared, based on contents of the ACKs. In a case that the contents of the ACKs indicate that the data is correctly received by the receivers, the correctly received data is cleared by the transmitters; and in a case that the contents of the ACKs indicate that the data is not correctly received by the receivers, the data is re-transmitted by the transmitters.

The receivers have sent the data on the first channel, and then continue to request or wait for the ACKs on the second channel, until all the data acknowledge frame s are received or the times for reserving the channels are over; and the transmitters send the data acknowledge frames on the second channel, until all the data acknowledge frames are sent or the times for reserving are over.

Optionally, the transmitter further includes a carrying unit, where the carrying unit is further configured to:

carry starting time for channel reservation in at least one of the first channel reservation frame and the second channel reservation frame, in the data or in the preamble.

Specifically, reference is made to FIG. 6, which is a schematic diagram of a method for transmitting data according to an embodiment of the present disclosure. As shown in FIG. 6, the transmitter STA1 makes the MAC Header to carry information of the time for the STA1 to start to reserve a channel, on which the MAC Header is located, and information of the length of the time for the reserving, and a response frame of the data sent by the receiver STA is received by the STA1 on the cannel during the time; an ACK is sent by the receiver STA2 on the second channel based on the time for starting to reserve the channel; and before the time for starting to reserve the channel, the second channel may be used by other STAs to transmit data. Since the channel is reserved by the STA1 after the time for starting to reserve the channel, NAVs are set to nonzero values for other STAs except the transmitter STA and the receiver STA, and the other STAs cannot transmit data on the channel during the time period indicated by the values of the NAVs.

The information of the time for the transmitter STA to start to reserve the channel, on which the MAC Header is located, and the information of the length of the time for the reserving, may also be carried in the channel reservation frame sent by the transmitter STA or in the preamble.

Optionally, the sending unit 1203 is configured to:

send an instruction for returning to a preset operating mode to the receiver, in a case that at least one of the first channel and the second channel is not successfully reserved by the transmitter.

Specifically, in a case that the second channel is not successfully reserved when the transmitter reserves the channel or starts to transmit the data, for example, no response of the channel reservation frame is obtained in a fixed time after the channel reservation frame is sent on the second channel, then transmitter needs to instruct the receiver to return to an initial operating mode.

A method for instructing the receiver to return to the initial operating mode may include: indicating that the second channel will no longer be used, in the subsequent data transmission.

The initial operating mode refers to that a response of the receiver to the data is received by the transmitter on the first channel after SIFS for sending the data on the first channel.

Reference is made to FIG. 9, which is a schematic diagram of efficiency illustrating data transmission in the conventional technology. As shown in FIG. 9, in a case of an OBSS, there are at least two transmitter AP1 and AP2, and there is a receiver STA3 in an area of the OBSS. The STA3 is associated with the AP2, that is, the AP1 sends no signal to the STA3. In another aspect, the STA3 has an ability to eliminate interference, with which an interference signal can be demodulated and be subtracted from a received signal, and then the signal received by the STA3 can be demodulated. In addition, channels of the AP1 are Channel1 and Channel2, and channels of the AP2 are Channel1, Channel2 and Channel3. The Channel1 and the Channel2 are occupied by the AP1, and all the channels of the AP2 are idle. On this premise, a data signal is sent by the AP2 on a data channel to the STA3. In a traditional mode of the conventional technology, the signal from the AP2 cannot be correctly demodulated by the STA3 because it is sensed by the STA3 that the Channel1 and the Channel2 are occupied, and even if the signal is correctly demodulated, no acknowledge response can be sent to the AP2. Base on the present disclosure, if the interference is eliminated and correct demodulation is performed an acknowledgement ACK response frame can be returned by the STA3 on the Channel3 to the AP2, so that the Channel1, the Channel2 and the Channel3 can be effectively utilized to transmit data on the premise that the Channel1 and the Channel2 are utilized by the AP1.

A receiver is provided according to embodiments of the present disclosure, with the receiver, the first channel and the second channel are reserved, where the first channel is used to transmit the data and the second channel is used to transmit an ACK; data is sent on the reserved first channel to the receiver; the ACK corresponding to the data sent by the receiver is received on the reserved second channel, and it is determined based on information carried in the ACK whether the data needs to be cached; and in a case that the information carried in the ACK indicates that the data is correctly received by the receiver, the data cached by the transmitter is cleared. By separately transmitting the data and the ACK, the problem that how to improve the efficiency of the MAC in the wireless system in a case of the limited cache capacity of the transmitter is solved.

Figure 13:
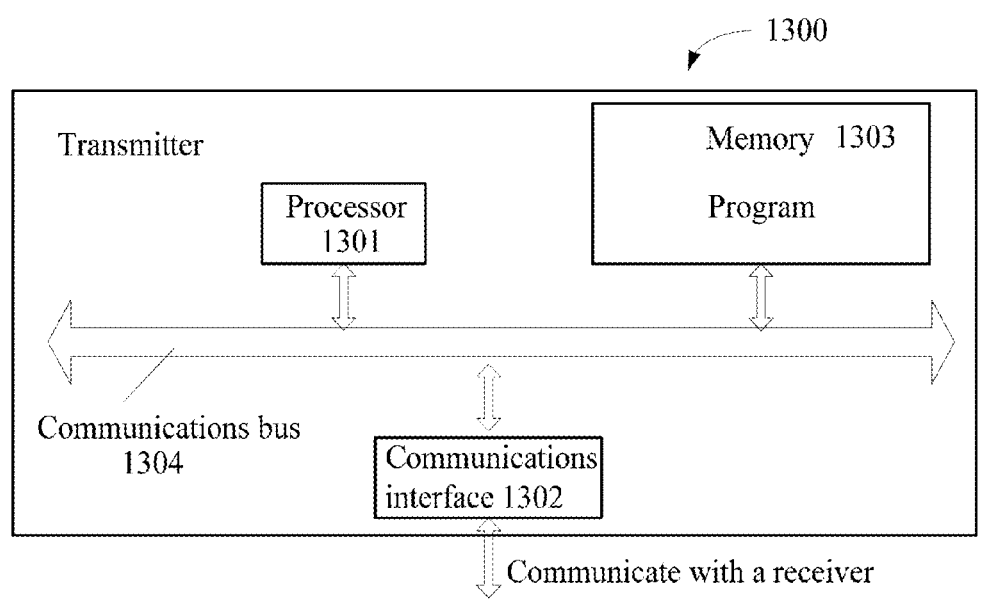
FIG. 13 is a structural diagram of a transmitter according to an embodiment of the present disclosure.

FIG. 13 is a structural diagram of a transmitter device according to an embodiment of the present disclosure. Reference is made to FIG. 13, which shows the transmitter 1300 according to the embodiment of the present disclosure, and the specific implementation of the transmitter 1300 is not limited in the embodiment of the present disclosure. The transmitter 1300 includes: a processor 1301, a communications interface 1302, a memory 1303 and a bus 1304.

The processor 1301, the communications interface 1302 and the memory 1303 communicate with each other via the bus 1034.

The communications interface 1302 is configured to communicate with a receiver.

The processor 1301 is configured to execute a program.

Specifically, the program may include program codes, and the program codes include computer operating instructions.

The processor 1301 may be a central processing unit CPU, an application specific integrated circuit ASIC, or, one or more integrated circuits configured to implement the embodiments of the present disclosure.

The memory 1303 is configured to store the program. The memory 1303 may include a high-speed RAM memory, and may further include a non-volatile memory, such as at least one magnetic disk memory. The program may include:

reserving, by a transmitter, a first channel and a second channel, where the first channel is used to transmit the data and the second channel is used to transmit an acknowledgement ACK;

sending, on the reserved first channel, the data, to a receiver; and receiving, on the reserved second channel, the ACK corresponding to the data, sent by the receiver.

Reserving, by a transmitter, a first channel and a second channel includes:

sending, by the transmitter, on the first channel, a first channel reservation frame, to the receiver, and sending, by the transmitter, on the second channel, a second channel reservation frame, to the receiver, where the first channel reservation frame is used to reserve the first channel and carry time for reserving the first channel, and the second channel reservation frame is used to reserve the second channel and carry time for reserving the second channel; and determining, by the transmitter, whether the first channel is successfully reserved, based on at least one of a response frame of the first channel reservation frame and a response frame of the second channel reservation frame, sent by the receiver, and determining, by the transmitter, whether the second channel is successfully reserved, based on at least one of the response frame of the first channel reservation frame and the response frame of the second channel reservation frame, sent by the receiver.

The method further includes:

carrying, by the transmitter, a maximum cache capacity, in at least one of the first channel reservation frame and the second channel reservation frame, in a preamble or in a capability field, where the maximum cache capacity is used by the receiver to determine latest time for sending the ACK corresponding to the data to the transmitter.

Sending, on the reserved first channel, the data, to a receiver includes:

sending, by the transmitter, on the reserved first channel, the data, to the receiver; and receiving, on the reserved second channel, the ACK corresponding to the data, sent by the receiver includes:

calculating, by the receiver, time for reaching the maximum cache capacity of the transmitter, based on a rate carried by the preamble at which the transmitter sends the data, or, receiving, by the receiver, the time for reaching the maximum cache capacity of the transmitter, sent by the transmitter;

sending, by the receiver, the ACK, to the transmitter, after idle PIFS time of the second channel, after SIFS time of the preamble or after a response request frame corresponding to the data is sent by the transmitter, and before the time for reaching the maximum cache capacity of the transmitter; or, sending, by the receiver, the ACK, to the transmitter, in a limited contention-free manner or by means of carrier sense multiple access, CSMA; and receiving, by the transmitter, on the second channel, the ACK corresponding to the data.

Sending, on the reserved first channel, the data, to a receiver includes:

sending, by the transmitter, on the reserved first channel, the data, to the multiple receivers, by means of downlink multi-user transmission; and receiving, on the reserved second channel, the ACK corresponding to the data, sent by the receiver includes:

receiving, by the multiple receivers, on the first channel, the data;

in a case that all the multiple receivers support uplink multi-user transmission, sending, by the transmitter, on the reserved second channel, response request frames corresponding to the data, and after the response request frames are received by the multiple receivers, sending by the multiple receivers acknowledgements ACKs to the transmitter at the same time by means of uplink multi-user transmission before a minimum one of times for reaching maximum cache capacities of the transmitter for the multiple receivers; or, in a case the multiple receivers do not support the uplink multi-user transmission, after the response request frames are received by the multiple receivers, calculating, by the multiple receivers, the times for reaching the maximum cache capacities of the transmitter, corresponding to the multiple receivers, based on rates carried by the preamble at which the transmitter sends respectively the data to the multiple receivers, and before the times for reaching the maximum cache capacities of the transmitter corresponding to the multiple receivers, sending respectively by the multiple receivers the acknowledgements ACKs to the transmitter; or, sending respectively by the multiple receivers on the second channel the ACKs to the transmitter in a limited contention-free manner; and receiving, by the transmitter, on the second channel, the ACKs corresponding to the data, sent by the multiple receivers.

Sending, on the reserved first channel, the data, to a receiver includes:

sending, by the multiple transmitters, on the first channel, the data, to the receiver, by means of uplink multi-user transmission; and receiving, on the reserved second channel, the ACK corresponding to the data, sent by the receiver includes:

calculating, respectively, by the receiver, latest times for reaching maximum cache capacities of the multiple transmitters, corresponding to the multiple transmitters, based on rates carried by preambles at which the multiple transmitters send the data to the receiver, and before a minimum one of the times for reaching the maximum cache capacities of the multiple transmitters, sending by the receiver acknowledgements ACKs to the multiple transmitters at the same time by means of downlink multi-user transmission; or, sending respectively by the multiple transmitters latest times corresponding to the multiple transmitters to the receiver, and receiving by the receiver the latest times; or, calculating, respectively, by the receiver, the times for reaching the maximum cache capacities of the multiple transmitters, corresponding to the multiple transmitters, based on the rates carried by the preambles at which the multiple transmitters send the data to the receiver, and before the times for reaching the maximum cache capacities of the multiple transmitters, sending respectively by the receiver the acknowledges ACKs to the multiple transmitters;

sending by the receiver on the second channel the ACKs to the multiple transmitters in a limited contention-free manner or by means of CSMA; and receiving, by the multiple transmitters, on the second channel, the ACKs corresponding to the data, sent by the receiver.

Sending, on the reserved first channel, the data, to a receiver includes:

sending, by the multiple transmitters, on the first channel, the data, to the multiple receivers, by means of cooperative transmission; and receiving, on the reserved second channel, the ACK corresponding to the data, sent by the receiver includes:

sending, respectively, by the multiple transmitters, on the reserved second channel, response request frames corresponding to the data, by means of Poll, and after the response request frames are received by the plurality of receivers and after SIFS, sending by the multiple receivers ACKs to the multiple transmitters; or, requesting the multiple receivers to send the ACKs by the multiple transmitters respectively on the second channel in a limited contention-free manner; or, sending respectively by the multiple receivers the ACKs to the multiple transmitters in a limited contention-free manner; and receiving, by the multiple transmitters, on the second channel, the ACKs corresponding to the data, sent by the multiple receivers.

The method further includes:

carrying, by the transmitter, starting time for channel reservation, in at least one of the first channel reservation frame and the second channel reservation frame, in the data or in the preamble.

The method further includes:

sending, by the transmitter, an instruction for returning to a preset operating mode, to the receiver, in a case that at least one of the first channel and the second channel is not successfully reserved by the transmitter.

The transmitter is provided according to the embodiments of the present disclosure, through the transmitter, the first channel and the second channel are reserved, where the first channel is used to transmit the data and the second channel is used to transmit an ACK; data is sent on the reserved first channel to the receiver; the ACK corresponding to the data sent by the receiver is received on the reserved second channel, and it is determined based on information carried in the ACK whether the data needs to be cached; and in a case that the information carried in the ACK indicates that the data is correctly received by the receiver, the data cached by the transmitter is cleared. By separately transmitting the data and the ACK, the problem that how to improve the efficiency of the MAC in the wireless system in a case of the limited cache capacity of the transmitter is solved.

Figure 14:
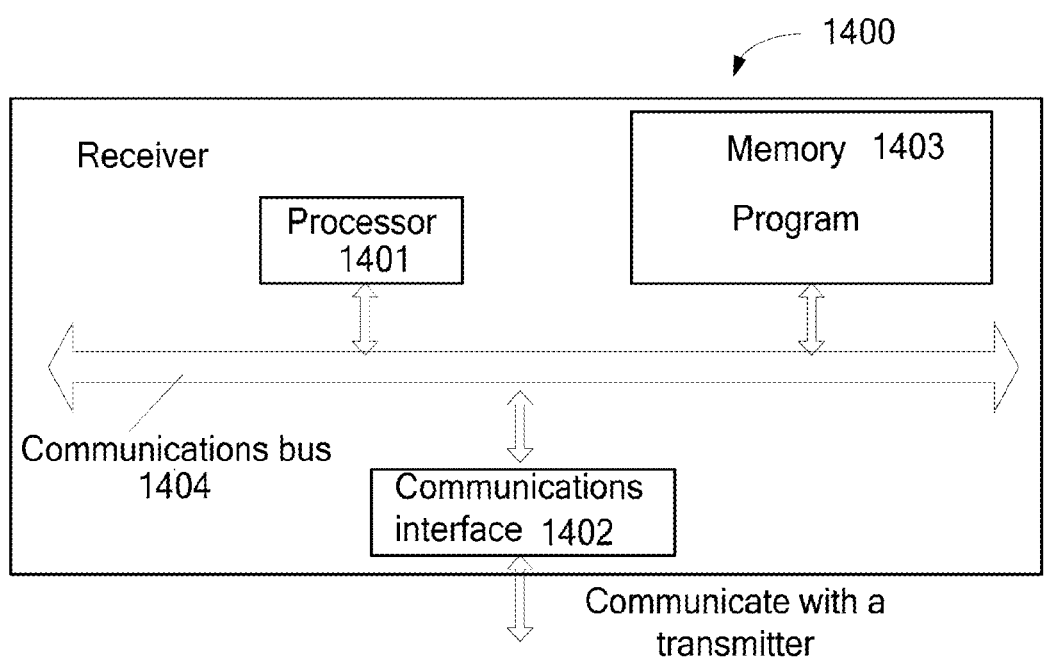
FIG. 14 is a structural diagram of a receiver according to an embodiment of the present disclosure.

FIG. 14 is a structural diagram of a receiver device according to an embodiment of the present disclosure. Reference is made to FIG. 14, which shows the receiver 1400 according to the embodiment of the present disclosure, and the specific implementation of the receiver 1400 is not limited in the embodiment of the present disclosure. The receiver 1400 includes: a processor 1401, a communications interface 1402, a memory 1403 and a bus 1404.

The processor 1401, the communications interface 1402 and the memory 1403 communicate with each other via the bus 1404.

The communications interface 1402 is configured to communicate with a transmitter.

The processor 1401 is configured to execute a program.

Specifically, the program may include program codes, and the program codes include computer operating instructions.

The processor 1401 may be a central processing unit CPU, an application specific integrated circuit ASIC, or, one or more integrated circuits configured to implement the embodiments of the present disclosure.

The memory 1403 is configured to store the program. The memory 1403 may include a high-speed RAM memory, and may further include a non-volatile memory, such as at least one magnetic disk memory. The program may include:

reserving, by a receiver, a first channel and a second channel, where the first channel is used to transmit the data and the second channel is used to transmit an acknowledgement ACK;

receiving, the data, sent by a transmitter on the first channel; and sending, on the reserved second channel, the ACK corresponding to the data, to the transmitter.

Reserving, by a receiver, a first channel and a second channel includes:

receiving, by the receiver, on the first channel, a first channel reservation frame, sent by the transmitter, and receiving, by the receiver, on the second channel, a second channel reservation frame, sent by the transmitter, where the first channel reservation frame is used to reserve the first channel and carry time for reserving the first channel, and the second channel reservation frame is used to reserve the second channel and carry time for reserving the second channel; and sending, by the receiver, at least one of a response frame of the first channel reservation frame and a response frame of the second channel reservation frame, to the transmitter, so as to enable the transmitter to determine whether the first channel is successfully reserved based on the at least one of the response frame of the first channel reservation frame and the response frame of the second channel reservation frame sent by the receiver, and to enable the transmitter to determine whether the second channel is successfully reserved based on the at least one of the response frame of the first channel reservation frame and the response frame of the second channel reservation frame sent by the receiver.

The method further includes:

carrying, by the transmitter, a maximum cache capacity, in at least one of the first channel reservation frame and the second channel reservation frame, in a preamble or in a capability field, where the maximum cache capacity is used by the receiver to determine latest time for sending the ACK corresponding to the data to the transmitter.

Receiving, the data, sent by a transmitter on the first channel includes:

receiving, the data, sent by the single transmitter on the first channel; and sending, on the reserved second channel, the ACK corresponding to the data, to the transmitter includes:

calculating, by the receiver, time for reaching the maximum cache capacity of the transmitter, based on a rate carried by the preamble at which the transmitter sends the data, or, receiving, by the receiver, the time for reaching the maximum cache capacity of the transmitter, sent by the transmitter;

sending, by the receiver, the ACK, to the transmitter, after idle PIFS time of the second channel, after SIFS time of the preamble or after a response request frame corresponding to the data is sent by the transmitter, and before the time for reaching the maximum cache capacity of the transmitter; or, sending, by the receiver, the ACK, to the transmitter, in a limited contention-free manner or by means of carrier sense multiple access, CSMA; and receiving, by the transmitter, on the second channel, the ACK corresponding to the data.

Receiving, the data, sent by a transmitter on the first channel includes:

sending, by the transmitter, on the reserved first channel, the data, to the multiple receivers, by means of downlink multi-user transmission; and sending, on the reserved second channel, the ACK corresponding to the data, to the transmitter includes:

receiving, by the multiple receivers, on the first channel, the data;

in a case that all the multiple receivers support uplink multi-user transmission, sending, by the transmitter, on the reserved second channel, response request frames corresponding to the data, and after the response request frames are received by the multiple receivers, sending by the multiple receivers acknowledgements ACKs to the transmitter at the same time by means of uplink multi-user transmission before a minimum one of times for reaching maximum cache capacities of the transmitter for the multiple receivers; or, in a case the multiple receivers do not support the uplink multi-user transmission, after the response request frames are received by the multiple receivers, calculating, by the multiple receivers, the times for reaching the maximum cache capacities of the transmitter, corresponding to the multiple receivers, based on rates carried by the preamble at which the transmitter sends respectively the data to the multiple receivers, and before the times for reaching the maximum cache capacities of the transmitter corresponding to the multiple receivers, sending respectively by the multiple receivers the acknowledgements ACKs to the transmitter; or, sending respectively by the multiple receivers on the second channel the ACKs to the transmitter in a limited contention-free manner; and receiving, by the transmitter, on the second channel, the ACKs corresponding to the data, sent by the multiple receivers.

Receiving, the data, sent by a transmitter on the first channel includes:

sending, by the multiple transmitters, on the first channel, the data, to the receiver, by means of uplink multi-user transmission; and sending, on the reserved second channel, the ACK corresponding to the data, to the transmitter includes:

calculating, respectively, by the receiver, latest times for reaching maximum cache capacities of the multiple transmitters, corresponding to the multiple transmitters, based on rates carried by preambles at which the multiple transmitters send the data to the receiver, and before a minimum one of the times for reaching the maximum cache capacities of the multiple transmitters, sending by the receiver acknowledgements ACKs to the multiple transmitters at the same time by means of downlink multi-user transmission; or, sending respectively by the multiple transmitters latest times corresponding to the multiple transmitters to the receiver, and receiving by the receiver the latest times; or, calculating, respectively, by the receiver, the times for reaching the maximum cache capacities of the multiple transmitters, corresponding to the multiple transmitters, based on the rates carried by the preambles at which the multiple transmitters send the data to the receiver, and before the times for reaching the maximum cache capacities of the multiple transmitters, sending respectively by the receiver the acknowledges ACKs to the multiple transmitters;

sending by the receiver on the second channel the ACKs to the multiple transmitters in a limited contention-free manner or by means of CSMA; and receiving, by the multiple transmitters, on the second channel, the ACKs corresponding to the data, sent by the receiver.

Receiving, the data, sent by a transmitter on the first channel includes:

sending, by the multiple transmitters, on the first channel, the data, to the multiple receivers, by means of cooperative transmission; and sending, on the reserved second channel, the ACK corresponding to the data, to the transmitter includes:

sending, respectively, by the multiple transmitters, on the reserved second channel, response request frames corresponding to the data, by means of Poll, and after the response request frames are received by the plurality of receivers and after SIFS, sending by the multiple receivers ACKs to the multiple transmitters; or, requesting the multiple receivers to send the ACKs by the multiple transmitters respectively on the second channel in a limited contention-free manner; or, sending respectively by the multiple receivers the ACKs to the multiple transmitters in a limited contention-free manner; and receiving, by the multiple transmitters, on the second channel, the ACKs corresponding to the data, sent by the multiple receivers.

The method further includes:

carrying, by the transmitter, starting time for channel reservation, in at least one of the first channel reservation frame and the second channel reservation frame, in the data or in the preamble.

The method further includes:

sending, by the transmitter, an instruction for returning to a preset operating mode, to the receiver, in a case that at least one of the first channel and the second channel is not successfully reserved by the transmitter.

A receiver is provided according to the embodiments of the present disclosure, with the receiver, the first channel and the second channel are reserved, where the first channel is used to transmit the data and the second channel is used to transmit an ACK; data is sent on the reserved first channel to the receiver; the ACK corresponding to the data sent by the receiver is received on the reserved second channel, and it is determined based on information carried in the ACK whether the data needs to be cached; and in a case that the information carried in the ACK indicates that the data is correctly received by the receiver, the data cached by the transmitter is cleared. By separately transmitting the data and the ACK, the problem that how to improve the efficiency of the MAC in the wireless system in a case of the limited cache capacity of the transmitter is solved.

The above descriptions are only preferred embodiments of the present disclosure, and are not used to limit the protection scope of the present disclosure. Various changes, equivalents and modifications which do not depart from the spirit and principle of the present disclosure fall within the scope of the present disclosure.

What is claimed is:

1. A method for transmitting data comprising:

reserving, by a transmitter, a first channel and a second channel, wherein the first channel is for communicating the data and the second channel is for communicating an acknowledgement (ACK) corresponding to the data, wherein reserving the first and second channels comprises:

sending, by the transmitter, on the first channel, a first channel reservation frame to the receiver, and sending, by the transmitter, on the second channel, a second channel reservation frame to the receiver, wherein the first channel reservation frame is used to reserve the first channel and carry information regarding a time for reserving the first channel, and the second channel reservation frame is used to reserve the second channel and carry information regarding a time for reserving the second channel; and determining, by the transmitter, whether the first channel is successfully reserved, based on at least one of a response frame of the first channel reservation frame and a response frame of the second channel reservation frame from the receiver, and determining, by the transmitter, whether the second channel is successfully reserved, based on at least one of the response frame of the first channel reservation frame and the response frame of the second channel reservation frame from the receiver;

in response to the first channel and the second channel being successfully reserved, sending, on the reserved first channel, the data to a receiver and receiving, on the reserved second channel, the ACK corresponding to the data from the receiver;

the method further including:
a) calculating, by the receiver, a time for reaching a maximum cache capacity of the transmitter based on a rate at which the transmitter sends the data, the rate being carried by the preamble, or
b) receiving, by the receiver, information regarding the time for reaching the maximum cache capacity of the transmitter from the transmitter; and the method further including:
a) sending, by the receiver, the ACK to the transmitter in a limited contention-free manner or via carrier sense multiple access (CSMA), or
b) before the time for reaching the maximum cache capacity of the transmitter, (i) sending, by the receiver, the ACK to the transmitter in response to an idle PCF inter-frame space (PIFS) time of the second channel elapsing, a short inter-frame space (SIFS) time of the preamble elapsing, or (ii) a response request frame corresponding to the data being sent by the transmitter, wherein the maximum cache capacity is carried in at least one of (a) the first and second channel reservation frames, (b) a preamble or (c) a capability field, wherein the maximum cache capacity is used by the receiver to determine a latest time for sending the ACK corresponding to the data to the transmitter.

2. The method according to claim 1, wherein sending, on the reserved first channel, the data to the receiver comprises: sending, by the transmitter, on the reserved first channel, the data to a plurality of receivers via downlink multi-user transmission;

wherein the method further comprises sending, by the transmitter, on the reserved second channel, response request frames corresponding to the data to the plurality of receivers;

wherein:
a) in case the plurality of receivers support uplink multi-user transmission, the plurality of receivers, in response to receiving the response request frames, send acknowledgements (ACKs) to the transmitter at a same time via uplink multi-user transmission before a minimum time for reaching maximum cache capacities of the transmitter; or
b) in case the plurality of receivers do not all support the uplink multi-user transmission, the plurality of receivers, in response to receiving the response request frames, calculate the times for reaching the maximum cache capacities of the transmitter, based on rates carried by the preamble at which the transmitter sends respectively the data to the plurality of receivers, and the plurality of receivers send respectively the ACKs to the transmitter before the times for reaching the maximum cache capacities of the transmitter; or
c) the plurality of receivers send on the second channel the ACKs to the transmitter in a limited contention-free manner; and wherein receiving, on the reserved second channel, the ACK corresponding to the data comprises receiving, by the transmitter, on the second channel, the ACKs corresponding to the data from the plurality of receivers.

3. The method according to claim 1, wherein sending, on the reserved first channel, the data to the receiver comprises: sending, by a plurality of transmitters, on the first channel, the data to the receiver via uplink multi-user transmission, and wherein the method further comprises:
a) calculating, by the receiver, latest times for reaching maximum cache capacities of the plurality of transmitters based on rates carried by preambles at which the plurality of transmitters send the data to the receiver, so that before a minimum time for reaching the maximum cache capacities of the plurality of transmitters, the receiver sends acknowledgements (ACKs) to the plurality of transmitters at a same time via downlink multi-user transmission; or
b) sending, by the plurality of transmitters, information regarding latest times to the receiver, so that before the minimum time for reaching the maximum cache capacities of the plurality of transmitters, the receiver sends the ACKs to the plurality of transmitters at a same time via downlink multi-user transmission; or
c) calculating, by the receiver, the times for reaching the maximum cache capacities of the plurality of transmitters based on the rates carried by the preambles at which the plurality of transmitters send the data to the receiver, so that before the times for reaching the maximum cache capacities of the plurality of transmitters, the receiver sends the ACKs to the plurality of transmitters; or
d) sending, by the receiver, on the second channel, the ACKs to the plurality of transmitters in a limited contention-free manner or via carrier sense multiple access (CSMA); and wherein receiving, on the reserved second channel, the ACK corresponding to the data from the receiver comprises: receiving, by the plurality of transmitters, on the second channel, the ACKs corresponding to the data from the receiver.

4. The method according to claim 1, wherein sending, on the reserved first channel, the data to the receiver comprises: sending, by a plurality of transmitters, on the first channel, the data to a plurality of receivers, via cooperative transmission;

wherein the method further comprises:
a) sending, by the plurality of transmitters, on the reserved second channel, response request frames corresponding to the data, via a poll (Poll), so that the plurality of receivers receive the response request frames and after a short inter-frame space (SIFS), sends ACKs to the plurality of transmitters; or b) requesting, by the plurality of transmitters, the plurality of receivers to send the ACKs, on the second channel in a limited contention-free manner; or
c) sending, by the plurality of receivers, the ACKs to the plurality of transmitters in a limited contention-free manner; and
wherein receiving, on the reserved second channel, the ACK corresponding to the data from the receiver comprises receiving, by the plurality of transmitters, on the second channel, the ACKs corresponding to the data from the plurality of receivers.

5. The method according to claim 1, wherein a starting time for channel reservation is carried in at least one of the first channel reservation frame and the second channel reservation frame, in the data or in the preamble.

6. The method according to claim 1, further comprising:
sending, by the transmitter, an instruction for returning to a preset operating mode to the receiver in case at least one of the first channel and the second channel is not successfully reserved by the transmitter.

7. A method for transmitting data comprising:
reserving, by a receiver, a first channel and a second channel, wherein the first channel is for communicating the data and the second channel is for communicating an acknowledgement (ACK) corresponding to the data wherein reserving the first and second channels comprises:
  receiving, by the receiver, on the first channel, a first channel reservation frame from the transmitter, and receiving, by the receiver, on the second channel, a second channel reservation frame from the transmitter, wherein the first channel reservation frame is used to reserve the first channel and carry information regarding a time for reserving the first channel, and the second channel reservation frame is used to reserve the second channel and carry information regarding a time for reserving the second channel; and
  sending, by the receiver, at least one of a response frame of the first channel reservation frame and a response frame of the second channel reservation frame, to the transmitter for enabling the transmitter to determine whether the first channel is successfully reserved based on the at least one of the response frame of the first channel reservation frame and the response frame of the second channel reservation frame from the receiver, and for enabling the transmitter to determine whether the second channel is successfully reserved based on the at least one of the response frame of the first channel reservation frame and the response frame of the second channel reservation frame from the receiver;
in response to the first channel and the second channel being successfully reserved, receiving the data from a transmitter on the reserved first channel and sending, on the reserved second channel, the ACK corresponding to the data to the transmitter;
the method further including:
a) calculating, by the receiver, a time for reaching a maximum cache capacity of the transmitter, based on a rate at which the transmitter sends the data, the rate being carried by the preamble, or
b) receiving, by the receiver, information regarding the time for reaching the maximum cache capacity of the transmitter from the transmitter; and
the method further including:
a) sending, by the receiver, the ACK to the transmitter in a limited contention-free manner or via carrier sense multiple access (CSMA), or
b) before the time for reaching the maximum cache capacity of the transmitter, sending, by the receiver, the ACK to the transmitter in response to an idle PCF inter-frame space (PIFS) time of the second channel elapsing, (i) a short inter-frame space (SIFS) time of the preamble elapsing, or (ii) a response request frame corresponding to the data being sent by the transmitter,
wherein the maximum cache capacity is carried in at least one of (a) the first and second channel reservation frames, (b) a preamble or (c) a capability field, wherein the maximum cache capacity is used by the receiver to determine a latest time for sending the ACK corresponding to the data to the transmitter.

8. The method according to claim 7,
wherein receiving the data from the transmitter on the first channel comprises sending, by the transmitter, on the reserved first channel, the data to a plurality of receivers via downlink multi-user transmission,
wherein the method further comprises sending, by the transmitter, on the reserved second channel, response request frames corresponding to the data to the plurality of receivers, and
wherein:
a) in case the plurality of receivers support uplink multi-user transmission, the plurality of receivers, in response to receiving the response request frames, send acknowledgements (ACKs) to the transmitter at a same time via uplink multi-user transmission before a minimum time for reaching maximum cache capacities of the transmitter; or
b) in case the plurality of receivers do not all support the uplink multi-user transmission, the plurality of receivers, in response to receiving the response request frames, calculate the times for reaching the maximum cache capacities of the transmitter, based on rates at which the transmitter sends respectively the data to the plurality of receivers carried by the preamble, and the plurality of receivers send respectively the ACKs to the transmitter before the times for reaching the maximum cache capacities of the transmitter;
or
c) the plurality of receivers send on the second channel, the ACKs to the transmitter in a limited contention-free manner; and
wherein the method further comprises receiving, by the transmitter, on the second channel, the ACKs corresponding to the data from the plurality of receivers.

9. The method according to claim 7, wherein receiving the data from the transmitter on the first channel comprises sending, by a plurality of transmitters, on the first channel, the data to the receiver via uplink multi-user transmission; and
a) calculating, by the receiver, latest times for reaching maximum cache capacities of the plurality of transmitters based on rates carried by preambles at which the plurality of transmitters send the data to the receiver, so that before a minimum time for reaching the maximum cache capacities of the plurality of transmitters, the receiver sends acknowledgements (ACKs) to the plurality of transmitters at a same time via downlink multi-user transmission; or
b) sending, by the plurality of transmitters, information regarding latest times to the receiver, so that before the minimum time for reaching the maximum cache capacities of the plurality of transmitters, the receiver sends the ACKs to the plurality of transmitters at a same time via downlink multi-user transmission; or c) calculating, by the receiver, the times for reaching the maximum cache capacities of the plurality of transmitters based on the rates at which the plurality of transmitters send the data to the receiver carried by the preambles, so that before the times for reaching the maximum cache capacities of the plurality of transmitters, the receiver sends the ACKs to the plurality of transmitters;

wherein sending, on the reserved second channel, the ACK corresponding to the data to the transmitter comprises:

sending, by the receiver, on the second channel, the ACKs to the plurality of transmitters in a limited contention-free manner or via carrier sense multiple access (CSMA); and receiving, by the plurality of transmitters, on the second channel, the ACKs corresponding to the data sent by the receiver.

10. The method according to claim 7, wherein the method further comprises sending, by a plurality of transmitters, on the first channel, the data to a plurality of receivers via cooperative transmission; and a) sending, by the plurality of transmitters, on the reserved second channel, response request frames corresponding to the data, via a poll (Poll), so that the plurality of receivers receive the response request frames and after a short inter-frame space (SIFS), and send ACKs to the plurality of transmitters; or b) requesting, by the plurality of transmitters, the plurality of receivers to send the ACKs, on the second channel in a limited contention-free manner; or c) sending, by the plurality of receivers, the ACKs to the plurality of transmitters in a limited contention-free manner; and wherein the method further comprises receiving, by the plurality of transmitters, on the second channel, the ACKs corresponding to the data from the plurality of receivers.

11. The method according to claim 7, wherein a starting time for channel reservation is carried in at least one of the first channel reservation frame and the second channel reservation frame, in the data or in the preamble.

* * * * *